(12) United States Patent
Oda et al.

(10) Patent No.: US 8,731,411 B2
(45) Date of Patent: May 20, 2014

(54) POLARIZATION FLUCTUATION COMPENSATION DEVICE AND OPTICAL COMMUNICATION SYSTEM

(75) Inventors: Shoichiro Oda, Kawasaki (JP); Takeshi Hoshida, Kawasaki (JP); Toshiki Tanaka, Kawasaki (JP); Hiroyuki Irie, Kawasaki (JP); Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 13/064,567

(22) Filed: Mar. 31, 2011

(65) Prior Publication Data

US 2011/0249971 A1 Oct. 13, 2011

(30) Foreign Application Priority Data

Apr. 7, 2010 (JP) ................................. 2010-088469

(51) Int. Cl.
*H04B 10/00* (2013.01)
(52) U.S. Cl.
USPC ............ 398/208; 398/211; 398/152; 398/158
(58) Field of Classification Search
USPC .................................. 398/152, 158, 203–208
See application file for complete search history.

(56) References Cited

U.S. PATENT DOCUMENTS

| | | | | |
|---|---|---|---|---|
| 4,903,342 A * | 2/1990 | Yamazaki | ...................... | 398/204 |
| 5,031,236 A * | 7/1991 | Hodgkinson et al. | ......... | 398/152 |
| 5,111,322 A | 5/1992 | Bergano et al. | | |
| 5,191,457 A * | 3/1993 | Yamazaki | ....................... | 398/79 |
| 5,416,628 A * | 5/1995 | Betti et al. | .................... | 398/185 |
| 5,424,861 A * | 6/1995 | Koning | ......................... | 398/152 |
| 5,432,632 A * | 7/1995 | Watanabe | ........................ | 398/76 |
| 5,841,557 A * | 11/1998 | Otsuka et al. | ................... | 398/65 |
| 5,896,211 A * | 4/1999 | Watanabe | ........................ | 398/76 |
| 5,930,414 A * | 7/1999 | Fishman et al. | ................ | 385/11 |
| 6,385,357 B1 | 5/2002 | Jopson et al. | | |
| 6,459,830 B1 * | 10/2002 | Pua et al. | ......................... | 385/24 |
| 6,522,796 B1 * | 2/2003 | Ziari et al. | ....................... | 385/11 |

(Continued)

FOREIGN PATENT DOCUMENTS

| | | |
|---|---|---|
| EP | 2159622 | 3/2010 |
| JP | 5-136761 | 6/1993 |

(Continued)

OTHER PUBLICATIONS

Patent Abstracts of Japanese Patent Application No. 5-327576, Published Dec. 10, 1993.

(Continued)

*Primary Examiner* — Agustin Bello
(74) *Attorney, Agent, or Firm* — Staas & Halsey LLP

(57) ABSTRACT

A polarization fluctuation compensation device, when WDM light received by, for example, an optical reception device includes a polarization scrambled optical signal and a non-polarization scrambled optical signal, collects information related to whether optical signals having respective wavelengths are polarization scrambled, obtains a target value of control parameters which are different from each other, according to the speed of polarization fluctuations in the non-polarization scrambled optical signal based on the collected information, and performs reception processing of the non-polarization scrambled optical signal by using a control parameter set as the target value. As a result, an influence of fast polarization fluctuations generated resulting from an interaction between optical signals having respective wavelengths can be reliably compensated for, thereby enabling to realize excellent reception characteristics.

13 Claims, 12 Drawing Sheets

(56) References Cited

U.S. PATENT DOCUMENTS

| | | | |
|---|---|---|---|
| 6,538,786 B1* | 3/2003 | Naito | 398/152 |
| 6,577,413 B1* | 6/2003 | Saunders | 398/65 |
| 6,604,871 B2* | 8/2003 | Cao | 398/158 |
| 6,647,176 B1* | 11/2003 | Pua et al. | 385/24 |
| 6,738,181 B1* | 5/2004 | Nakamoto et al. | 359/337 |
| 6,847,743 B2* | 1/2005 | Yamaguchi | 385/11 |
| 6,891,674 B2* | 5/2005 | Damask | 359/484.01 |
| 6,999,688 B1* | 2/2006 | Hui et al. | 398/205 |
| 7,050,658 B2* | 5/2006 | Chung et al. | 385/1 |
| 7,054,553 B2* | 5/2006 | Chung et al. | 398/29 |
| 7,106,970 B2* | 9/2006 | Fujiwara et al. | 398/81 |
| 7,206,517 B1* | 4/2007 | Yu et al. | 398/152 |
| 7,391,977 B2* | 6/2008 | Yao | 398/152 |
| 7,583,895 B2* | 9/2009 | Nakamura et al. | 398/65 |
| 7,680,412 B2* | 3/2010 | Anderson et al. | 398/26 |
| 7,702,241 B2* | 4/2010 | Veith | 398/81 |
| 7,715,717 B2* | 5/2010 | Weiershausen et al. | 398/65 |
| 7,873,286 B2* | 1/2011 | Frankel | 398/213 |
| 7,933,522 B2* | 4/2011 | Rasmussen et al. | 398/147 |
| 7,995,918 B2* | 8/2011 | Raddatz et al. | 398/29 |
| 8,000,610 B2* | 8/2011 | Yao | 398/152 |
| 8,032,022 B2* | 10/2011 | Zhou et al. | 398/32 |
| 8,195,046 B2* | 6/2012 | Xia et al. | 398/29 |
| 8,229,302 B2* | 7/2012 | Von Der Weid | 398/147 |
| 8,280,246 B2* | 10/2012 | Pincemin et al. | 398/25 |
| 8,483,573 B2* | 7/2013 | Kotake et al. | 398/152 |
| 2001/0055133 A1* | 12/2001 | Yamaguchi et al. | 359/110 |
| 2003/0223759 A1* | 12/2003 | Corbel et al. | 398/147 |
| 2006/0013592 A1* | 1/2006 | Isomura et al. | 398/152 |
| 2006/0029398 A1 | 2/2006 | Liu et al. | |
| 2007/0248361 A1* | 10/2007 | Nakamura et al. | 398/152 |
| 2008/0101799 A1 | 5/2008 | Raddatz et al. | |
| 2008/0107425 A1* | 5/2008 | Rasmussen et al. | 398/152 |
| 2008/0112706 A1* | 5/2008 | Kim et al. | 398/91 |
| 2008/0205886 A1* | 8/2008 | Anderson et al. | 398/26 |
| 2009/0047030 A1* | 2/2009 | Hoshida | 398/205 |
| 2009/0162059 A1* | 6/2009 | Nakamoto | 398/48 |
| 2009/0214201 A1 | 8/2009 | Oda et al. | |
| 2011/0142440 A1* | 6/2011 | Xia et al. | 398/16 |
| 2011/0182589 A1* | 7/2011 | Kotake et al. | 398/152 |
| 2011/0249971 A1* | 10/2011 | Oda et al. | 398/65 |
| 2012/0237206 A1* | 9/2012 | Izumi | 398/25 |

FOREIGN PATENT DOCUMENTS

| | | |
|---|---|---|
| JP | 5-327576 | 12/1993 |
| JP | 9-149006 | 6/1997 |
| JP | 2002-344426 | 11/2002 |
| JP | 2006-50640 | 2/2006 |
| JP | 2009-198364 | 9/2009 |
| JP | 2011-155579 | 8/2011 |

OTHER PUBLICATIONS

Patent Abstracts of Japanese Patent Application No. 2002-344426, Published Nov. 29, 2002.

S. Hinz et al., "Interference detection enabling 2×20Gbit/s RZ polarisation division multiplex transmission", Electronics Letters, vol. 37, No. 8, Apr. 12, 2001, pp. 511-512.

Mikio Yagi, et al., "Field Trial of 214-KM-Long 160-GBIT/S Polarization-Division Multiplexed RZ-DQPSK Transmission System Using Automatic Polarization Control", IEICE, Mar. 18-21, 2008, pp. S-98-S-99.

Ito et al., "Comparison of 100Gb/s transmission performances between RZ-DQPSK and polarization multiplexed NRZ/RZ-DPSK with automatic polarization de-multiplexer", OFC/NFOEC 2008, JThA46 (3 pages).

Peter Noutsios, "In-Service Measurements of Polarization Fluctuations on Field-installed OC-192 DWDM Systems," Signals, Systems and Electronics, 2007, Issue '07, International Symposium on IEEE, Jul. 1, 2007, pp. 323-326.

European Patent Office Communication dated Aug. 4, 2011 in Appln. No. 11160179.5.

Japanese Office Action mailed Dec. 17, 2013 in corresponding Japanese Patent Application No. 2010-088469.

Espacenet English Abstract of Japanese Publication No. 2011-155579, Published Aug. 11, 2011.

* cited by examiner

OPTICAL RECEIVER CONFIGURATION EXAMPLE (1)

OPTICAL RECEIVER CONFIGURATION EXAMPLE (2)

FIG.7

ONE EXAMPLE OF OPERATION IN POLARIZATION
FLUCTUATION COMPENSATION DEVICE 5

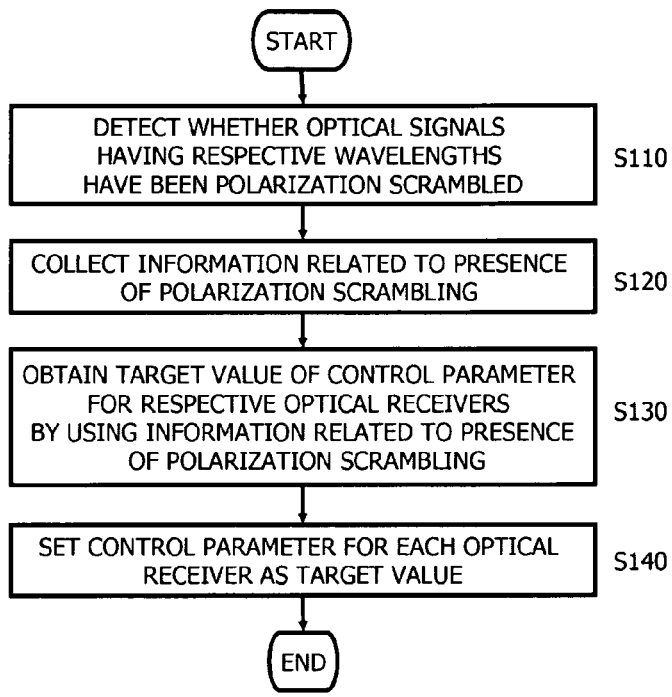

FIG.8

| WAVE-LENGTH | $\lambda_1$ | $\lambda_2$ | $\lambda_3$ | $\lambda_4$ | $\lambda_5$ | $\lambda_6$ | $\lambda_7$ | $\lambda_8$ |
|---|---|---|---|---|---|---|---|---|
| #1 | 0 | 1 | 1 | 1 | 1 | 1 | 1 | 1 |
| #2 | 0 | 0 | 1 | 1 | 1 | 1 | 1 | 1 |
| #3 | 0 | 0 | 0 | 1 | 1 | 1 | 1 | 1 |
| #4 | 0 | 0 | 0 | 0 | 1 | 1 | 1 | 1 |

 0:NON-POLARIZATION SCRAMBLED WAVELENGTH
1:POLARIZATION SCRAMBLED WAVELENGTH

| WAVE-LENGTH | $\lambda_1$ | $\lambda_2$ | $\lambda_3$ | $\lambda_4$ | $\lambda_5$ | $\lambda_6$ | $\lambda_7$ | $\lambda_8$ |
|---|---|---|---|---|---|---|---|---|
| p(#1) | $\alpha 1$ | - | - | - | - | - | - | - |
| p(#2) | $\alpha 1$ | $\alpha 1$ | - | - | - | - | - | - |
| p(#3) | $\alpha 2$ | $\alpha 1$ | $\alpha 1$ | - | - | - | - | - |
| p(#4) | $\alpha 3$ | $\alpha 2$ | $\alpha 1$ | $\alpha 1$ | - | - | - | - |

$\alpha 1 > \alpha 2 > \alpha 3$

| WAVE-LENGTH | $\lambda_1$ | $\lambda_2$ | $\lambda_3$ | $\lambda_4$ | $\lambda_5$ | $\lambda_6$ | $\lambda_7$ | $\lambda_8$ |
|---|---|---|---|---|---|---|---|---|
| #1 | 0.3 | 1 | 1 | 1 | 1 | 1 | 1 | 1 |
| #2 | 0.3 | 0.3 | 1 | 1 | 1 | 1 | 1 | 1 |
| #3 | 0.2 | 0.3 | 0.3 | 1 | 1 | 1 | 1 | 1 |
| #4 | 0.1 | 0.2 | 0.3 | 0.3 | 1 | 1 | 1 | 1 |

| WAVE-LENGTH | $\lambda_1$ | $\lambda_2$ | $\lambda_3$ | $\lambda_4$ | $\lambda_5$ | $\lambda_6$ | $\lambda_7$ | $\lambda_8$ |
|---|---|---|---|---|---|---|---|---|
| p(#1) | $\alpha 1$ | - | - | - | - | - | - | - |
| p(#2) | $\alpha 1$ | $\alpha 1$ | - | - | - | - | - | - |
| p(#3) | $\alpha 2$ | $\alpha 1$ | $\alpha 1$ | - | - | - | - | - |
| p(#4) | $\alpha 3$ | $\alpha 2$ | $\alpha 1$ | $\alpha 1$ | - | - | - | - |

$\alpha 1 > \alpha 2 > \alpha 3$

| WAVE-LENGTH | $\lambda_1$ | $\lambda_2$ | $\lambda_3$ | $\lambda_4$ | $\lambda_5$ | $\lambda_6$ | $\lambda_7$ | $\lambda_8$ |
|---|---|---|---|---|---|---|---|---|
| #5 | 0 | 0 | 0 | 0 | 1 | 1 | 1 | 1 |
| #6 | 0 | 0 | 0 | 1 | 1 | 1 | 1 | 1 |
| #7 | 0 | 1 | 1 | 1 | 1 | 1 | 1 | 1 |

POLARIZATION FLUCTUATION COMPENSATION DEVICE AND OPTICAL COMMUNICATION SYSTEM

CROSS-REFERENCE TO RELATED APPLICATION

This application is based upon and claims the benefit of priority of the prior Japanese Patent Application No. 2010-088469, filed on Apr. 7, 2010, the entire contents of which are incorporated herein by reference.

FIELD

The embodiments discussed herein are related to; a polarization fluctuation compensation device for compensating for deterioration of reception characteristic due to fluctuations in the polarization state of transmitted light in optical communication, and an optical communication system.

BACKGROUND

In wavelength division multiplexing (WDM) optical communication system, polarization scrambling may be applied to an optical signal in order to suppress the occurrence of polarization dependent gain (or polarization dependent loss) held by an optical repeater, and polarization hole burning (PHB), or to alleviate quality deterioration of a signal waveform due to nonlinearity of an optical fiber (for example, refer to Japanese Laid-Open Patent Publication No. 9-149006).

Moreover, in WDM optical communication system, an optical signal of a modulation format different from an existing channel may be added as a new channel at the time of upgrading the system. In this case, if wavelengths of optical signals of different modulation system are arranged adjacent to each other, performance of the system may be deteriorated resulting from a difference in the cross-phase modulation effect due to the difference of the modulation formats. In order to avoid this, a technique has been proposed where wavelength bands in which each optical signal is arranged, are grouped for each modulation format, and a guard band is provided between respective wavelength bands (for example, refer to Japanese Laid-Open Patent Publication No. 2006-50640).

To realize a large capacity of the optical communication system, research and development of a digital coherent receiver has been currently in progress. In the digital coherent receiver, polarization information included in received light needs to be restructured, following polarization fluctuations in the optical signal, which may occur at a certain rate due to an environmental change, for example, in an optical transmission path. This restructuring of polarization information of the received light is performed by subjecting a photoelectrically converted reception signal to digital signal processing by using a finite impulse response (FIR) filter or the like. In restructuring of polarization information by means of digital signal processing, the arithmetic processing thereof is under a high load, and hence there is a limitation on high speed processing. Therefore, a configuration in which the above-described polarization scrambling is basically not applied to an optical signal received by the digital coherent receiver has been studied.

When the existing optical communication system applied with polarization scrambling is to be upgraded by using the digital coherent receiver, a polarization scrambled optical signal and a non-polarization scrambled optical signal are simultaneously transmitted inside the optical fiber. At this time, the polarization state, phase, and amplitude of the non-polarization scrambled optical signal may fluctuate timewise due to the cross-phase modulation effect and Raman amplification effect resulting from the nonlinearity of the optical fiber. If the polarization state of the optical signal received by the digital coherent receiver fluctuates at a speed faster than a normally assumed speed due to an influence of polarization scrambling applied to other optical signals, digital signal processing for restructuring the polarization information cannot follow the fast fluctuation of the polarization state. Therefore, there is a problem in that quality deterioration of the signal waveform occurs at the time of restructuring the polarization information of the received light.

The above problem is not limited to the case in which the optical signal is received by using the digital coherent receiver, but is common to various types of reception systems using the polarization information of the optical signal. Moreover, the polarization state of the transmitted light may fluctuate faster than the normally assumed speed resulting from an interaction between respective optical signals, due to some sort of phenomenon other than polarization scrambling. Therefore, in reception processing of the optical signal using the polarization information, it is an important issue to reduce the influence of polarization fluctuations faster than the normally assumed speed, on the reception processing.

SUMMARY

Accordingly, the invention provides a polarization fluctuation compensation device that compensates for the quality deterioration of a signal waveform occurring in reception processing of WDM light including a plurality of optical signals having different wavelengths. One aspect of the polarization fluctuation compensation device includes: an information collection circuit adapted to collect information related to the speed of polarization fluctuations in optical signals having respective wavelengths; a parameter calculator circuit adapted to obtain a target value of a control parameter corresponding to each wavelength, based on information collected by the information collection circuit, so that a control parameter in the reception processing related to polarization information of the optical signals having respective wavelengths takes a different value according to the speed of polarization fluctuations in the optical signals having respective wavelengths; and a parameter setting circuit adapted to set the target value obtained by the parameter calculator circuit, as a control parameter in the reception processing corresponding to the respective wavelengths.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a flowchart illustrating an example of an operation in a polarization fluctuation compensation device of the first embodiment.

FIG. 8 is a diagram illustrating an example of a table referred to by a parameter calculator.

DESCRIPTION OF EMBODIMENTS

Hereunder is a detailed description of embodiments of the present invention, with reference to the accompanying drawings.

Figure 1:
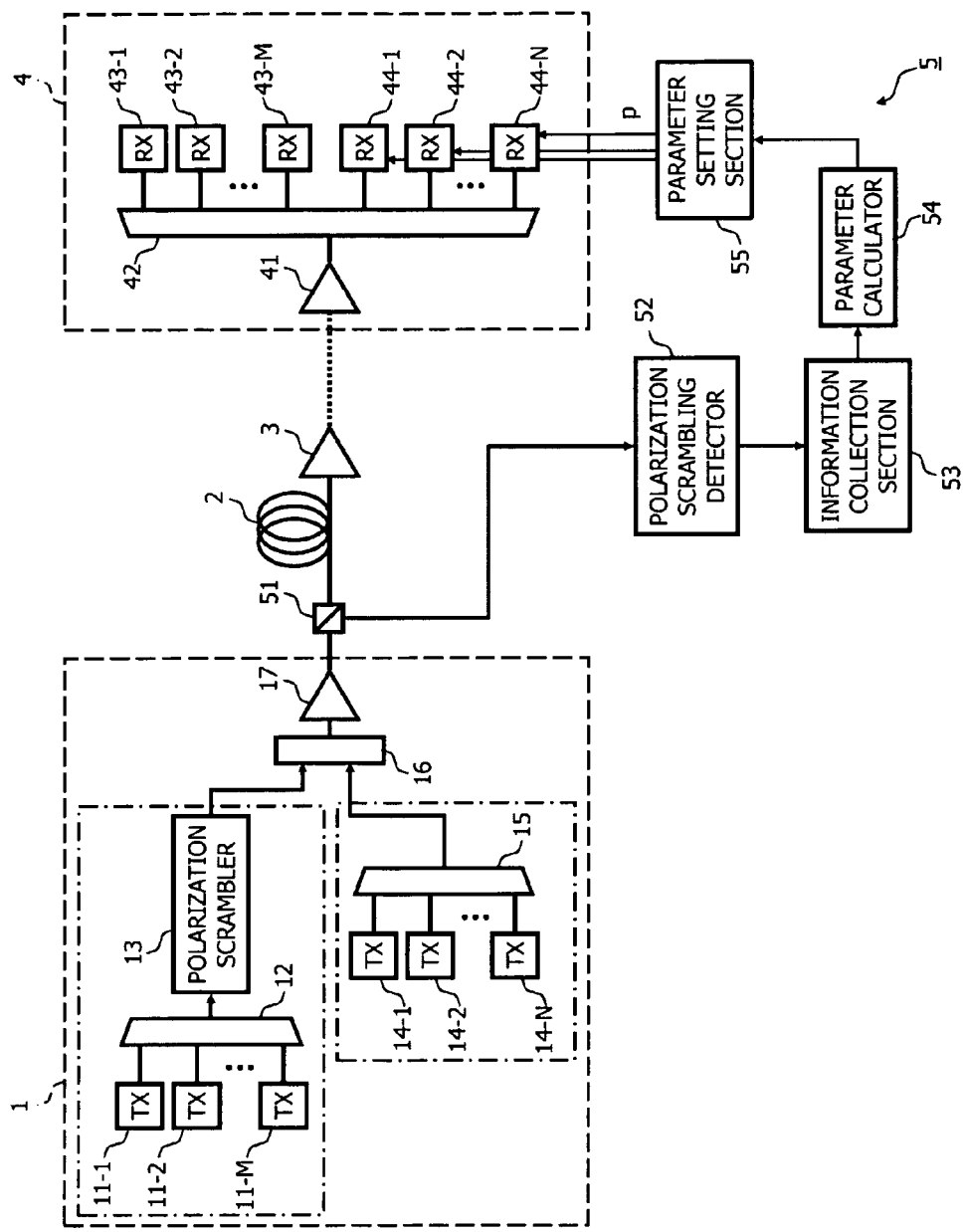
FIG. 1 is a diagram illustrating the configuration of a first embodiment of an optical communication system.

FIG. 1 is a diagram illustrating the configuration of a first embodiment of an optical communication system.

In FIG. 1, in the optical communication system of the first embodiment, WDM light in which, for example, a polarization scrambled optical signal and a non-polarization scrambled optical signal are multiplexed, is transmitted from an optical transmission device 1 to an optical transmission line 2, and the WDM light is repeatedly transmitted, while being amplified by an optical repeater 3 arranged on the optical transmission line 2, and is received by an optical reception device 4. The optical communication system includes a polarization fluctuation compensation device 5 that extracts a part of the WDM light transmitted from the optical transmission device 1 to the optical transmission line 2 as monitoring light, and detects whether optical signals having respective wavelengths included in the monitoring light are polarization scrambled, thereby compensating for polarization fluctuations in reception processing corresponding to a non-polarization scrambled optical signal performed by the optical reception device 4, based on the detection result thereof.

The optical transmission device 1 generates optical signals having wavelengths $\lambda_1$ to $\lambda_M$ different from each other in M (M is an integer equal to or larger than 1) optical transmitters (TX) 11-1 to 11-M, multiplexes the respective optical signals by a multiplexer 12, and scrambles the polarization state of the optical signals having respective wavelengths $\lambda_1$ to $\lambda_M$ by providing output light of the multiplexer 12 to a polarization scrambler 13. Moreover, the optical transmission device 1 generates optical signals having wavelengths $\lambda_{M+1}$ to $\lambda_{M+N}$ different from each other in N (N is an integer equal to or larger than 1) optical transmitters (TX) 14-1 to 14-N, and multiplexes the respective optical signals by a multiplexer 15. Then the optical transmission device 1 multiplexes output light from the polarization scrambler 13 and output light from the multiplexer 15 by a multiplexer 16 to generate WDM light having (M+N) waves, amplifies the WDM light to a required level by a post-amplifier 17, and outputs the WDM light to the optical transmission line 2.

The above configuration of the optical transmission device 1 corresponds to a configuration in which the optical transmitters 14-1 to 14-N and the multiplexers 15 and 16 are added to the existing configuration including the optical transmitters (TX) 11-1 to 11-M, the multiplexer 12, the polarization scrambler 13, and the post-amplifier 17, by for example upgrading the optical communication system.

A splitter 51 of the polarization fluctuation compensation device 5 is arranged on the optical transmission line 2 positioned near the output terminal of the optical transmission device 1, and a part of the WDM light output from the optical transmission device 1 to the optical transmission line 2 is extracted by the splitter 51 as monitoring light. The WDM light having passed through the splitter 51 is amplified by the optical repeater 3 arranged at a required interval on the optical transmission line 2, and repeatedly transmitted to the optical reception device 4.

The WDM light repeatedly transmitted on the optical transmission line 2 is input to the optical reception device 4, and the optical reception device 4 amplifies the WDM light to a required level by a pre-amplifier 41 and demultiplexes the WDM light to optical signals having respective wavelengths $\lambda_1$ to $\lambda_{M+N}$ by a demultiplexer 42. Then the optical reception device 4 receives the (polarization scrambled) optical signals output from the demultiplexer 42 and having respective wavelengths $\lambda_1$ to $\lambda_M$ by optical receivers (RX) 43-1 to 43-M corresponding to the respective wavelengths, and receives the (non-polarization scrambled) optical signals having respective wavelengths $\lambda_{M+1}$ to $\lambda_{M+N}$ by respective optical receivers (RX) 44-1 to 44-N corresponding to the respective wavelengths. The respective optical receivers 43-1 to 43-M on the polarization scrambled side have a general configuration corresponding to a reception system that basically does not use the polarization information of the optical signal. On the other hand, the respective optical receivers 44-1 to 44-N on the non-polarization scrambled side correspond to a reception system that uses the polarization information of the optical signal.

The above configuration of the optical reception device 4 corresponds to a configuration for when the optical receivers 44-1 to 44-N are added by using an unused port of the demultiplexer 42, to the existing configuration including the pre-amplifier 41, the demultiplexer 42, and the optical receivers 43-1 to 43-M, by the aforementioned upgrading of the optical communication system. Specific configuration examples of the respective optical receivers 44-1 to 44-N will be described later.

The polarization fluctuation compensation device 5 provides monitoring light extracted by the splitter 51 to a polarization scrambling detector 52, and the polarization scrambling detector 52 detects whether the optical signals having respective wavelengths $\lambda_1$ to $\lambda_{M+N}$ included in the monitoring light have been polarization scrambled. Information related to the presence of polarization scrambling corresponding to the respective wavelengths $\lambda_1$ to $\lambda_{M+N}$ detected by the polarization scrambling detector 52 is collected by an information collection section 53. The information collection section 53 may be circuit. Then in the polarization fluctuation compensation device 5, a parameter calculator 54 obtains a target value of a control parameter to be applied to the processing related to the polarization information of received light performed by the respective optical receivers 44-1 to 44-N corresponding to a reception method using the polarization information of the optical signal, by using the information from the information collection section 53, and transmits the result thereof to a parameter setting section 55. The parameter calculator 54 and the parameter setting section 55 may be circuits. The parameter setting section 55 sets the target value obtained by the parameter calculator 54 as a control parameter p in the reception processing by the corresponding optical receivers 44-1 to 44-N inside the optical reception device 4. As a result, the reception processing for compensating for polarization fluctuations occurring in the respective wavelengths $\lambda_{M+1}$ to $\lambda_{M+N}$ due to the influence of polarization scrambling with respect to the optical signals having respective wavelengths $\lambda_1$ to $\lambda_M$ is performed by the respective optical receivers 44-1 to 44-N. A specific configuration example of the polarization scrambling detector 52 and details of the processing in the parameter calculator 54 will be described later.

Here a specific configuration example of the respective optical receivers 44-1 to 44-N on the non-polarization scrambled side is described below.

Figure 2:
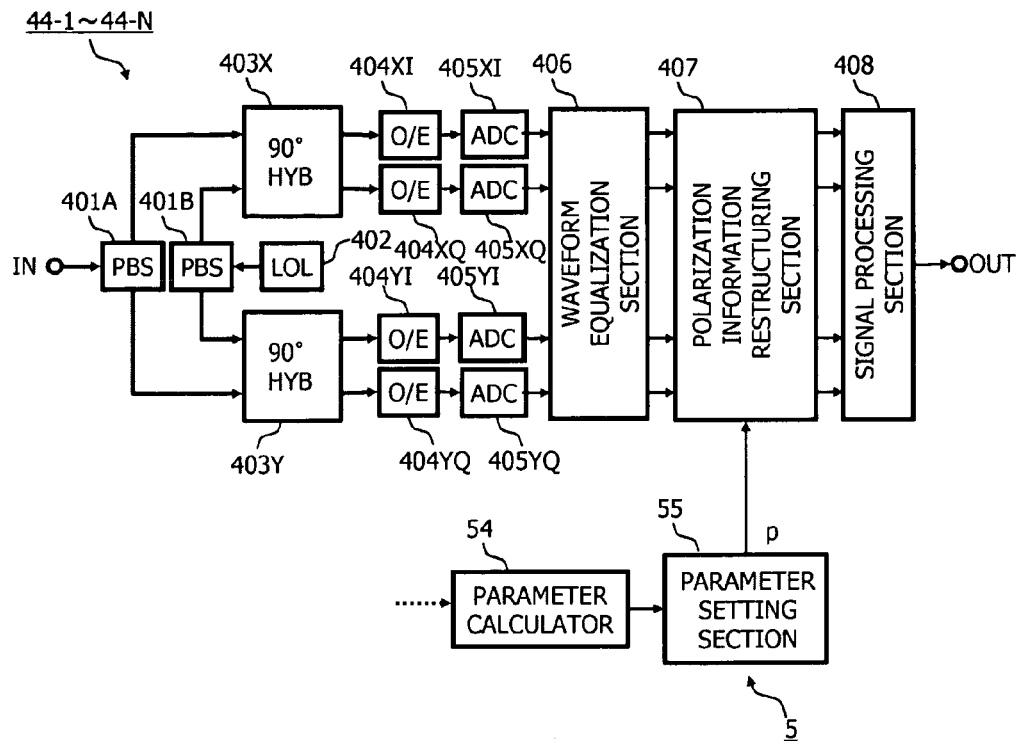
FIG. 2 is a diagram illustrating a configuration example at the time of using a digital coherent receiver in an optical receiver in FIG. 1.

FIG. 2 is a block diagram illustrating a configuration example (1) for a case where a digital coherent receiver is used as the respective optical receivers 44-1 to 44-N. In the configuration example (1), an optical signal output from the demultiplexer 42 (FIG. 1) of the optical reception device 4 is provided to an input port IN. The input light is, for example, a polarization multiplexing phase modulated optical signal. Input light to the optical receivers is separated to two different polarization components by a polarization beam splitter (PBS) 401A. One polarization component (for example, the X polarization component) is output to an optical hybrid circuit (HYB) 403X, and the other polarization component (for example, the Y polarization component) is output to an optical hybrid circuit 403Y.

Local oscillation light to be output from a local oscillation light source (LOL) 402 is respectively input to the respective optical hybrid circuits 403X and 403Y via a polarization beam splitter (PBS) 401B. The local oscillation light is continuous light having substantially the same frequency as the frequency of the input light. The optical hybrid circuit 403X mixes the X polarization component of input light and the local oscillation light, thereby generating optical signals of an in-phase (I) component and a quadrature-phase (Q) component with optical phases thereof being different by 90 degrees from each other. Moreover the optical hybrid circuit 403Y also mixes the Y polarization component of the input light and the local oscillation light, thereby generating optical signals of the I-component and the Q-component, with optical phases thereof being different by 90 degrees from each other.

The respective optical signals of the I-component and the Q-component respectively output from the respective optical hybrid circuits 403X and 403Y are converted to digital electric signals by respectively corresponding optical receivers (O/E) 404XI, 404XQ 404YI, and 404YQ, and AD converters (ADC) 405XI, 405XQ, 405YI, and 405YQ. As a result, I-component data and Q-component data corresponding to the X polarization of the input light, and I-component data and Q-component data corresponding to the Y polarization of the input light can be acquired, and respective data are output to a waveform equalization section 406. One set of I-component data and Q-component data corresponds to one complex number, and the I-component data expresses a value of a real part of a certain complex number, and the Q-component data expresses a value of an imaginary part of the complex number. An optical electric field (optical amplitude and optical phase) corresponding to one polarization component of the input light is expressed by one set of I-component data and Q-component data.

The waveform equalization section 406 performs arithmetic processing for compensating for dispersion or the like of the optical transmission path 2, with respect to output data from the AD converters 405XI, 405XQ 405YI, and 405YQ thereby performing waveform equalization of the optical signal. The respective data processed by the waveform equalization section 406 is output to a polarization information restructuring section 407. The polarization information restructuring section 407 performs arithmetic processing for restructuring information corresponding to the X polarization and the Y polarization with respect to respective output data from the waveform equalization section 406, according to the polarization fluctuations in the optical signal input to the digital coherent receiver.

Figure 3:
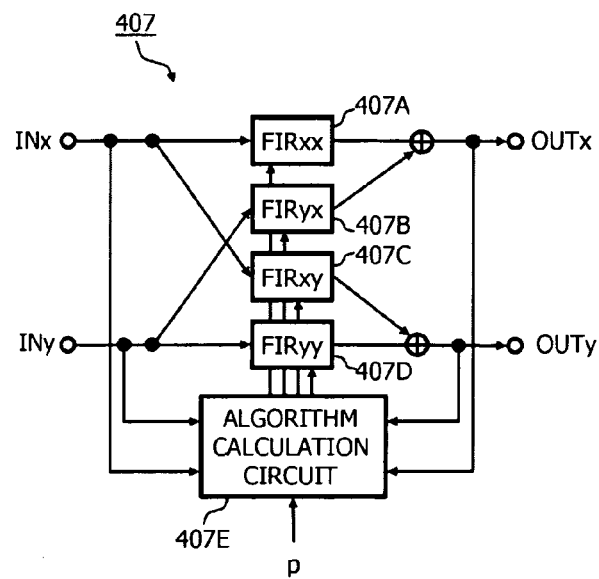
FIG. 3 is a circuit diagram illustrating a specific configuration example of a polarization information restructuring section in FIG. 2.

FIG. 3 is a circuit diagram illustrating a specific configuration example of the polarization information restructuring section 407. In the configuration example, output data corresponding to the X polarization from the waveform equalization section 406 is provided to an input port INx, and output data corresponding to the Y polarization from the waveform equalization section 406 is provided to an input port INy. An FIR filter (FIRxx) 407A and an FIR filter (FIRxy) 407C are connected in parallel to the input port INx, and an FIR filter (FIRyx) 407B and an FIR filter (FIRyy) 407D are connected in parallel to the input port INy.

Figure 4:
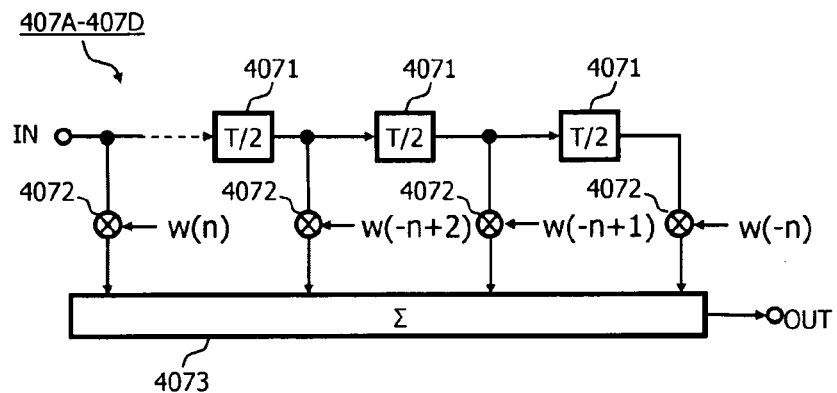
FIG. 4 is a circuit diagram illustrating a specific example of an FIR filter in FIG. 3.

FIG. 4 is a circuit diagram illustrating a specific example of the FIR filters 407A to 407D. The FIR filter includes; 2n delay elements (T/2) 4071 connected in series to the input port IN, multipliers 4072 connected to the input port IN and output ends of the respective delay elements 4071, and an adder ($\Sigma$) 4073 to which outputs of the respective multipliers 4072 are provided. The respective delay elements 4071 delay the input signal by time T/2. Accordingly, a signal delayed stepwise by T/2 to n×T is acquired by the 2n delay elements 4071. The respective multipliers 4072 multiply the input signal by a filter coefficient w corresponding to the number of delay steps. A calculation result of an algorithm calculation circuit 407E in FIG. 3 is applied as the filter coefficient w.

The algorithm calculation circuit 407E calculates the filter coefficient w according to a well-known adaptive equalization algorithm by using the control parameter p provided from the polarization fluctuation compensation device 5. Specific examples of the adaptive equalization algorithm include a least mean square (LMS) algorithm expressed by equation (1) below, a constant modulus algorithm (CMA) expressed by equation (2) below, and the like.

LMS algorithm:

$$w(n+1)=w(n)-\mu r^*(n)(y_n-s_n) \quad (1)$$

CMA $$w(n+1)=w(n)-\mu r^*(n)(|y_n|^2-\gamma)y_n \quad (2)$$

where, in equations (1) and (2), w denotes a filter coefficient, r denotes a reception signal, $y_n$ denotes a filter output signal, $s_n$ denotes a training signal, $\gamma$ denotes a constant, and $\mu$ denotes a step size. In these adaptive equalization algorithms, the control parameter p from the polarization fluctuation compensation device 5 is provided as the step size $\mu$.

The adder 4073 adds up the multiplication results acquired by the respective multipliers 4072. A signal indicating the addition result of the adder 4073 is output from an output port OUT of the FIR filter. Moreover output signals from the two FIR filters 407A and 407B in the polarization information restructuring section 407 (FIG. 3) are added, and output as data corresponding to the restructured X polarization. Moreover, output signals from the remaining two FIR filters 407C and 407D are added, and output as data corresponding to the restructured Y polarization.

Returning to FIG. 2, data calculated by the polarization information restructuring section 407 is provided to a signal processing section 408. The signal processing section 408 uses the output data from the polarization information restructuring section 407 to perform digital signal processing such as frequency offset compensation, phase synchronization, and signal identification, and outputs the received data.

Figure 5:
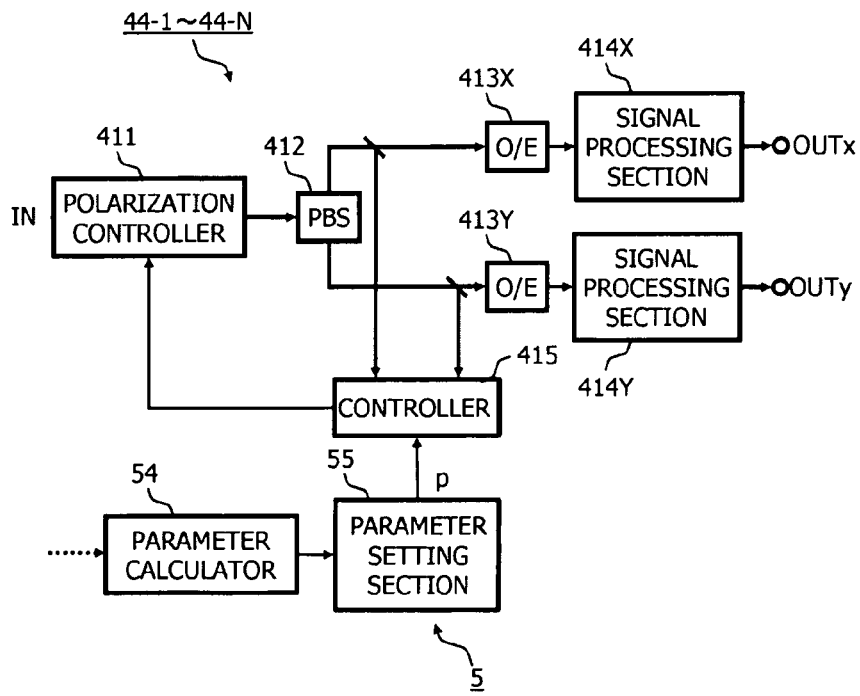
FIG. 5 is a diagram illustrating a configuration example at the time of using a direct detection receiver in the optical receiver in FIG. 1.

FIG. 5 is a block diagram illustrating a configuration example (2) for a case where a direct detection receiver is used as the respective optical receivers 44-1 to 44-N in FIG. 1. In the configuration example (2), as in the case of the configuration example (1) illustrated in FIG. 2 to FIG. 4, an optical signal (for example, polarization multiplexing phase modulated optical signal) output from the demultiplexer 42 (FIG. 1) of the optical reception device 4 is provided to the input port IN. Input light to the optical receiver is input to a polarization controller 411, and the polarization direction of the input light with respect to an optical axis of a polarization beam splitter (PBS) 412 connected to an output end of the polarization controller 411, is controlled by the polarization controller 411.

Output light from the polarization controller 411 is separated into two different polarization components by the PBS 412. One polarization component (for example, the X polarization component) is output to an optical receiver (O/E) 413X, and the other polarization component (for example, the Y polarization component) is output to an optical receiver (O/E) 413Y. At this time, a part of the respective output lights from the PBS 412 is branched and provided to a controller 415. The controller 415 monitors the power of the respective branched lights, and feed-back controls the polarization controller 411 according to the monitoring results thereof. Here the control parameter p from the polarization fluctuation compensation device 5 is provided to the controller 415 as a loop gain in the feed-back control of the polarization controller 411 by the controller 415.

The respective optical receivers 413X and 413Y convert the respective output lights from the PBS 412 to electric signals, and output the electric signals to respective signal processing sections 414X and 414Y. The respective signal processing sections 414X and 414Y perform processing such as signal identification or error correction with respect to the output signals from the respective optical receivers 413X and 413Y, to thereby generate and output received data.

Next is a description of a specific configuration example of the polarization scrambling detector 52 illustrated in FIG. 1.

Figure 6:
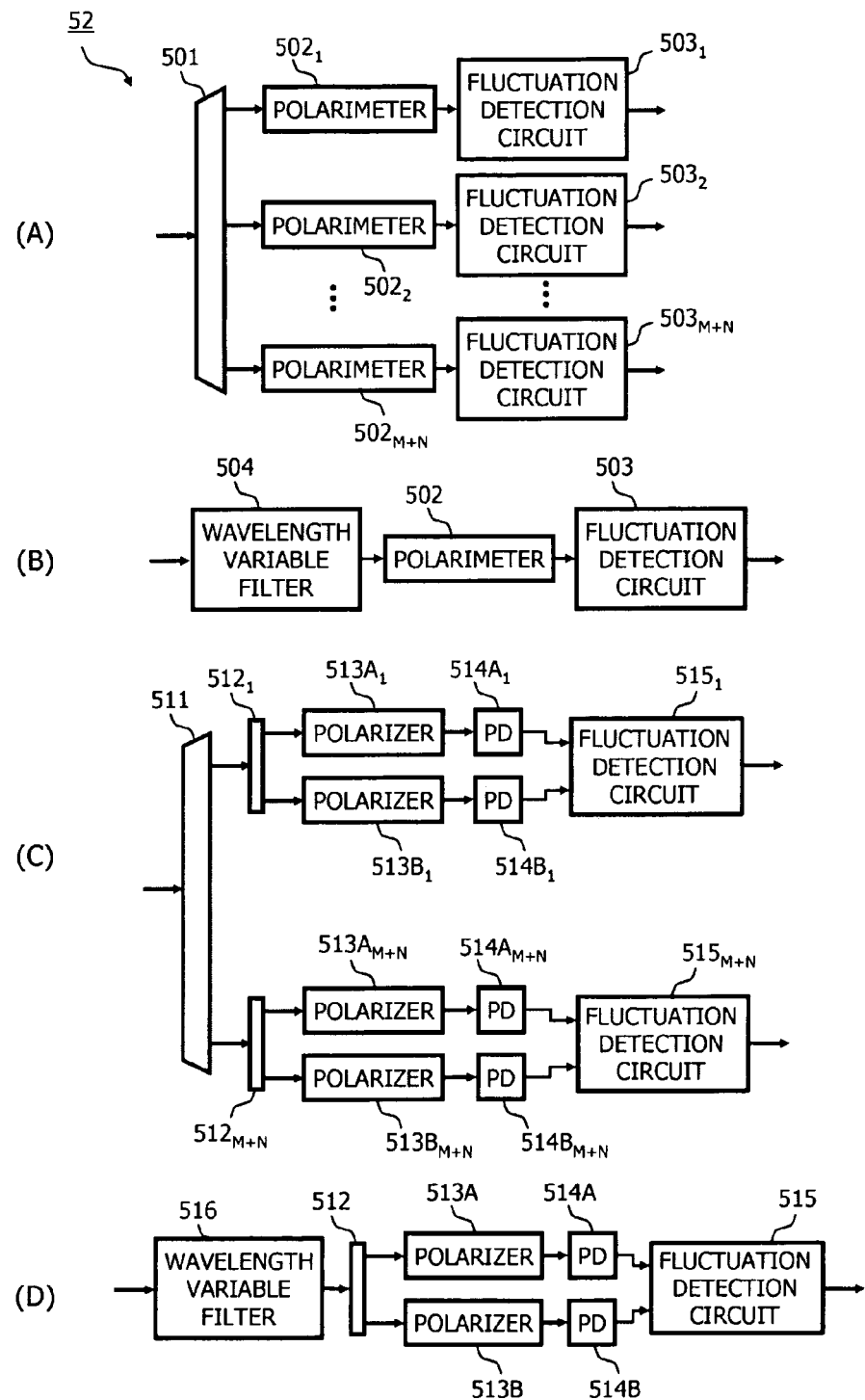
FIG. 6 is a diagram illustrating a specific configuration example of a polarization scrambling detector in FIG. 1.

FIG. 6 is a block diagram illustrating specific configuration examples (A) to (D) of the polarization scrambling detector 52. The configuration example (A) illustrated at the top in FIG. 6 includes a demultiplexer 501, M+N polarimeters $502_1$ to $502_{M+N}$, and M+N fluctuation detection circuits $503_1$ to $503_{M+N}$. Monitor light obtained by extracting a part of the WDM light output from the optical transmission device 1 (FIG. 1), by the splitter 51, is input to the demultiplexer 501, and the demultiplexer 501 demultiplexes the monitor light to optical signals having respective wavelengths $\lambda_1$ to $\lambda_{M+N}$ and outputs the optical signals. The respective polarimeters $502_1$ to $502_{M+N}$ monitor a Stokes parameter expressing the polarization state of the respective optical signals demultiplexed by the demultiplexer 501. The respective fluctuation detection circuits $503_1$ to $503_{M+N}$ detect the speed (frequency) of polarization fluctuations in the optical signal, based on a change in the Stokes parameter monitored by the respective polarimeters $502_1$ to $502_{M+N}$, to determine whether polarization scrambling has been performed, and transmit the determination result thereof to the information collection section 53.

In the configuration example (B) illustrated in the second stage in FIG. 6, a wavelength variable filter 504 is used instead of the demultiplexer 501 in the configuration example (A) so that a central wavelength of a transmission band of the wavelength variable filter 504 is matched with the respective wavelengths $\lambda_1$ to $\lambda_{M+N}$ and switched sequentially, thereby decreasing the installed number of the polarimeters 502 and the fluctuation detection circuits 503 to realize downsizing and cost reduction.

The configuration example (C) illustrated in the third stage in FIG. 6 includes a demultiplexer 511, M+N splitters $512_1$ to $512_{M+N}$, 2×(M+N) polarizers $513A_1$, $513B_1$ to $513A_{M+N}$, and $513B_{M+N}$, photodiodes (PD) $514A_1$, $514B_1$ to $514A_{M+N}$, and $514B_{M+N}$, and M+N fluctuation detection circuits $515_1$ to $515_{M+N}$. Monitor light obtained by extracting a part of WDM light output from the optical transmission device 1 (FIG. 1), by the splitter 51 is input to the demultiplexer 511, and the demultiplexer 511 demultiplexer the monitor light into optical signals having respective wavelengths $\lambda_1$ to $\lambda_{M+N}$ and outputs the optical signals. The respective splitters $512_1$ to $512_{M+N}$ branch the respective optical signals demultiplexed by the demultiplexer 511 into two and output these optical signals.

One set of polarizers $513A_1$ and $513B_1$ corresponding to wavelength $\lambda_1$ respectively have an optical axis with the direction thereof being different from each other, and cut out a specific polarization component along the direction of the optical axis from the respective optical signals branched by the splitter $512_1$ into two, and output the polarization components to the PDs $514A_1$ and $514B_1$. The respective PD $514A_1$ and $514B_1$ convert the light cut out by the respective polarizers $513A_1$ and $513B_1$ to electric signals and output the electric signals to the fluctuation detection circuit $515_1$. The fluctuation detection circuit $515_1$ detects the speed (frequency) of the polarization fluctuations in the optical signal of wavelength $\lambda_1$, based on the output signals from the respective PDs $514A_1$ and $514B_1$ to determine whether polarization scrambling has been performed, and transmits the determination result thereof to the information collection section 53. Polarizers $513A_2$, $513B_2$ to $513A_{M+N}$, and $513B_{M+N}$, PDs $514A_2$, $514B_2$ to $514A_{M+N}$, and $514B_{M+N}$, and fluctuation detection circuits $515_2$ to $515_{M+N}$ corresponding to other wavelength $\lambda_2$ to $\lambda_{M+N}$ have the same configuration as those of the polarizers $513A_1$ and 513B$_1$, the PDs 514A$_1$ and 514B$_1$, and the fluctuation detection circuit 515$_1$ corresponding to the wavelength $\lambda_1$.

In the configuration example (D) illustrated in the fourth stage in FIG. 6, a wavelength variable filter 516 is used instead of the demultiplexer 511 in the configuration example (C), and a central wavelength of a transmission band of the wavelength variable filter 516 is matched with respective wavelengths $\lambda_1$ to $\lambda_{M+N}$ and switched sequentially, thereby decreasing the installed number of the splitters 512, the polarizers 513A and 513B, the PDs 514A and 514B, and the fluctuation detection circuits 515 to realize downsizing and cost reduction.

In the configuration examples (C) and (D), for an optical signal of one wavelength, different polarization components are cut out by using a set of polarizers 513A and 513B. However, only a specific polarization component can be cut out by a single polarizer to determine the presence of polarization scrambling based on a change in the power. In this case, the detection accuracy for the presence of polarization scrambling decreases compared to the case of using one set of polarizers, however, further downsizing and cost reduction can be realized.

Next is a description of an operation of the optical communication system of the first embodiment.

In the optical communication system of the above configuration, an optical signal having wavelengths $\lambda_1$ to $\lambda_M$ polarization scrambled by the polarization scrambler 13 inside the optical transmission device 1, and an optical signal having wavelengths $\lambda_{M+1}$ to $\lambda_{M+N}$ non-polarization scrambled, pass through the same optical transmission path 2 from the optical transmission device 1 and are repeatedly transmitted to the optical reception device 4, while being amplified by the optical repeater 3. At the time of repeated transmission of the WDM light, temporal fluctuations occur in the polarization state, phase, and amplitude of the non-polarization scrambled optical signals having wavelengths $\lambda_{M+1}$ to $\lambda_{M+N}$, due to the cross-phase modulation (XPM) effect and Raman amplification effect by the polarization scrambled optical signals having wavelengths $\lambda_1$ to $\lambda_M$.

Here the influence of the XPM effect by the polarization scrambled optical signals is specifically explained. When it is assumed that a polarization scrambling frequency in the polarization scrambler 13 is f, and a polarization rotation frequency of the polarization scrambled optical signal is $\omega=2\pi f$, an electric field Ep of the optical signal is expressed by the following equation (3).

$$E_p = \begin{pmatrix} E_{px} \\ E_{py} \end{pmatrix} = \begin{pmatrix} \cos\omega t & -\sin\omega t \\ \sin\omega t & \cos\omega t \end{pmatrix} \begin{pmatrix} E_0 \\ 0 \end{pmatrix} \quad (3)$$

where $E_{px}$ denotes the electric field of the X polarization component, and $E_{py}$ denotes the electric field of the Y polarization component. Moreover $E_0$ denotes the electric field of the (linearly-polarized) optical signal before polarization scrambling, and t denotes time.

The amount of phase shift due to XPM applied to optical signals of other wavelengths by the polarization scrambled optical signal is expressed by the following equation (4) (for example, refer to G. P. Agrawal, Nonlinear Fiber Optics, 4th ed., Academic Press, San Diego, 2007, Chapter 6.2). Loss in the optical transmission path 2 and walk-off due to wavelength dispersion is ignored.

$$\begin{aligned}\phi_{XPM\_x} &= 2\gamma L|E_{px}|^2 + \frac{2}{3}\gamma L|E_{py}|^2 \\ &= \left(2\cos^2\omega t + \frac{2}{3}\sin^2\omega t\right)\gamma L|E_0|^2 \\ \phi_{XPM\_y} &= 2\gamma L|E_{py}|^2 + \frac{2}{3}\gamma L|E_{px}|^2 \\ &= \left(2\sin^2\omega t + \frac{2}{3}\cos^2\omega t\right)\gamma L|E_0|^2\end{aligned} \quad (4)$$

where $\Phi_{XPM\_x}$ denotes the phase shift amount due to XPM with respect to an X-polarized optical signal, and $\Phi_{XPM\_y}$ denotes the phase shift amount due to XPM with respect to a Y-polarized optical signal. Moreover, $\gamma$ denotes the nonlinear coefficient of the optical transmission path 2, and L denotes the overall length of the optical transmission path 2.

It is seen from the relation in equation (4) that the phase of the X polarization component and the phase of the Y polarization component in the optical signals of other wavelengths fluctuate at frequency 2f due to the influence of XPM by the polarization scrambled optical signal. That is, the polarization scrambled optical signal and the non-polarization scrambled optical signal are transmitted together on the optical transmission path 2, thereby adding a polarization fluctuation with frequency 2f to the polarization scrambled optical signal.

The polarization fluctuation with frequency 2f occurring in the non-polarization scrambled optical signal due to the influence of the above polarization scrambled optical signal is faster than the polarization fluctuations occurring due to an environmental change in the optical transmission path, and signal processing performed by the optical receiver that receives the optical signal cannot follow the fast polarization fluctuation. The level of polarization fluctuations occurring in the non-polarization scrambled optical signal due to the influence of polarization scrambling is related to the relative arrangement between the wavelength of the polarization scrambled optical signal and the wavelength of the non-polarization scrambled optical signal.

Therefore in the first embodiment, the polarization fluctuation compensation device 5 detects whether polarization scrambling has been performed with respect to the optical signals having respective wavelengths $\lambda_1$ to $\lambda_{M+N}$ transmitted from the optical transmission device 1 to the optical transmission path 2, and optimizes the control parameter p in the signal processing in the optical receivers 44-1 to 44-N corresponding to the non-polarization scrambled optical signal, taking the relation of relative wavelength arrangement into consideration based on the detection result thereof, thereby compensating for polarization fluctuations due to the influence of polarization scrambling.

FIG. 7 is a flowchart illustrating one example of an operation in the polarization fluctuation compensation device 5.

When the optical communication system is activated, in step S110 in FIG. 7 (indicated by S110 in FIG. 7, and similarly hereunder), the polarization scrambling detector 52 detects whether the optical signals having respective wavelengths $\lambda_1$ to $\lambda_{M+N}$ included in the WDM light transmitted from the optical transmission device 1 to the optical transmission path 2 have been polarization scrambled. In the processing performed by the polarization scrambling detector 52, for example, when the speed of the polarization fluctuation detected for wavelengths $\lambda_1$ to $\lambda_{M+N}$ according to the respective configuration examples (A) to (D) illustrated in FIG. 6 exceeds a threshold level preset according to the frequency f of the polarization scrambler 13, it is determined that the wavelength is polarization scrambled. When the speed of the polarization fluctuation is lower than the threshold level, it is determined that the wavelength is non-polarization scrambled.

In step 120, information related to whether the optical signals having respective wavelengths $\lambda_1$ to $\lambda_{M+N}$ detected by the polarization scrambling detector 52 have been polarization scrambled is collected by the information collection section 53.

In step 130, using the information of the information collection section 53, the parameter calculator 54 obtains a target value of the control parameter p provided to the optical receivers 44-1 to 44-N corresponding to the non-polarization scrambled wavelengths $\lambda_{M+1}$ to $\lambda_{M+N}$. Here, for example as illustrated in FIG. 8, the parameter calculator 54 determines the target value of the control parameter p corresponding to the information obtained by the information collection section 53, by referring to a table in which target values (p(#1) to p(#4) in the lower stage in FIG. 8) of the control parameter p corresponding to a combination (#1 to #4 in the upper stage in FIG. 8) of polarization scrambled optical signals and non-polarization scrambled optical signals having the respective wavelengths, are preset. The table can be appropriately set or changed according to; the type of optical fiber used for the optical transmission path 2, the input power of the optical signal to the optical transmission path 2, the number of wavelength multiplexing and the wavelength interval of the WDM light, the frequency f of the polarization scrambler 13, and the system parameter such as of the modulation format of the respective optical signals. FIG. 8 illustrates one example of a case in which the number of wavelength multiplexing of the WDM light is 8.

The relation set in the table in FIG. 8 is explained in detail. In the combination #1 of the non-polarization scrambled optical signal of wavelength $\lambda_1$ and the polarization scrambled optical signals of wavelengths $\lambda_2$ to $\lambda_8$, comparatively fast polarization fluctuations occur in the optical signal of wavelength $\lambda_1$, due to the optical signal of wavelength $\lambda_1$ receiving a strong influence of polarization scrambling with respect to the optical signals of adjacent wavelength $\lambda_2$ and the next wavelength $\lambda_3$. Therefore, in the setting p(#1) of the control parameter p corresponding to the combination #1, $\alpha 1$ capable of compensating for the polarization fluctuation is set as a target value of the control parameter p corresponding to wavelength $\lambda_1$. Because wavelengths $\lambda_2$ to $\lambda_8$ correspond to polarization scrambled optical signals, setting of the control parameter p is not required.

In the combination #2 of the non-polarization scrambled optical signals of wavelengths $\lambda_1$ and $\lambda_2$ and the polarization scrambled optical signals of wavelengths $\lambda_3$ to $\lambda_8$, comparatively fast polarization fluctuations occur in the optical signals of wavelengths $\lambda_1$ and $\lambda_2$ due to receiving a strong influence of polarization scrambling with respect to the optical signals of wavelength $\lambda_3$ to $\lambda_5$, as in the case of the combination #1. Therefore, $\alpha 1$ is respectively set as a target value of the control parameter p corresponding to wavelengths $\lambda_1$ and $\lambda_2$.

Furthermore in the combination #3 of the non-polarization scrambled optical signals of wavelengths $\lambda_1$ to $\lambda_3$ and the polarization scrambled optical signals of wavelengths $\lambda_4$ to $\lambda_8$, comparatively fast polarization fluctuations occur in the optical signals of wavelengths $\lambda_2$ and $\lambda_3$ due to receiving a strong influence of polarization scrambling with respect to the optical signals of wavelengths $\lambda_4$ to $\lambda_6$, and the influence of polarization scrambling also reaches the optical signal of wavelength $\lambda_1$, and polarization fluctuations also occur in the optical signal of wavelength $\lambda_1$, although slower than that of wavelengths $\lambda_2$ and $\lambda_3$. Therefore, in the setting p(#3) of the control parameter p corresponding to the combination #3, $\alpha 1$ is set as a target value of the control parameter p corresponding to wavelengths $\lambda_2$ and $\lambda_3$, and $\alpha 2$ smaller than $\alpha 1$ is set as a target value of the control parameter p corresponding to wavelength $\lambda_1$.

Moreover, in the combination #4 of the non-polarization scrambled optical signals of wavelengths $\lambda_1$ to $\lambda_4$ and the polarization scrambled optical signals of wavelengths $\lambda_5$ to $\lambda_8$, comparatively fast polarization fluctuations occur in the optical signals of wavelengths $\lambda_3$ and $\lambda_4$ due to receiving a strong influence of polarization scrambling with respect to the optical signals of wavelengths $\lambda_5$ to $\lambda_7$, and the influence of polarization scrambling also reaches the optical signal of wavelength $\lambda_2$, and polarization fluctuations also occur in the optical signal of wavelength $\lambda_2$, although slower than that of wavelengths $\lambda_3$ and $\lambda_4$. Furthermore the influence of polarization scrambling also reaches the optical signal of wavelength $\lambda_1$, though slightly, and a polarization fluctuation slower than that of wavelength $\lambda_2$ occurs in the optical signal of wavelength $\lambda_1$. Therefore, in the setting p(#4) of the control parameter p corresponding to the combination #4, $\alpha 1$ is set as a target value of the control parameter p corresponding to wavelengths $\lambda_3$ and $\lambda_4$, $\alpha 2$ smaller than $\alpha 1$ is set as a target value of the control parameter p corresponding to wavelength $\lambda_2$, and $\alpha 3$ smaller than $\alpha 2$ is set as a target value of the control parameter p corresponding to wavelength $\lambda_1$.

When the target value of the control parameter p corresponding to the presence of polarization scrambling is obtained by the parameter calculator 54 in this manner, control proceeds to step 140 in FIG. 7, and the parameter setting section 55 sets the control parameters in the reception processing in the optical receivers 44-1 to 44-N on the non-polarization scrambled side to the target values obtained by the parameter calculator 54. As a result, in the case of the digital coherent receiver in the configuration example (1) illustrated in FIG. 2 to FIG. 4, a step size $\mu$ to be used in the arithmetic processing according to the adaptive equalization algorithm in the polarization information restructuring section 407 is optimized. Moreover, in the case of the direct detection receiver in the configuration example (2) illustrated in FIG. 5, the loop gain in the feed-back control of the polarization controller 411 by the controller 415 is optimized. Accordingly, the non-polarization scrambled optical signal and the polarization scrambled optical signal are simultaneously transmitted, thereby enabling to reliably compensate for the influence of fast polarization fluctuations occurring in the non-polarization scrambled optical signal, and the reception processing of the optical signal using the polarization information can be performed with high accuracy.

Figure 9:
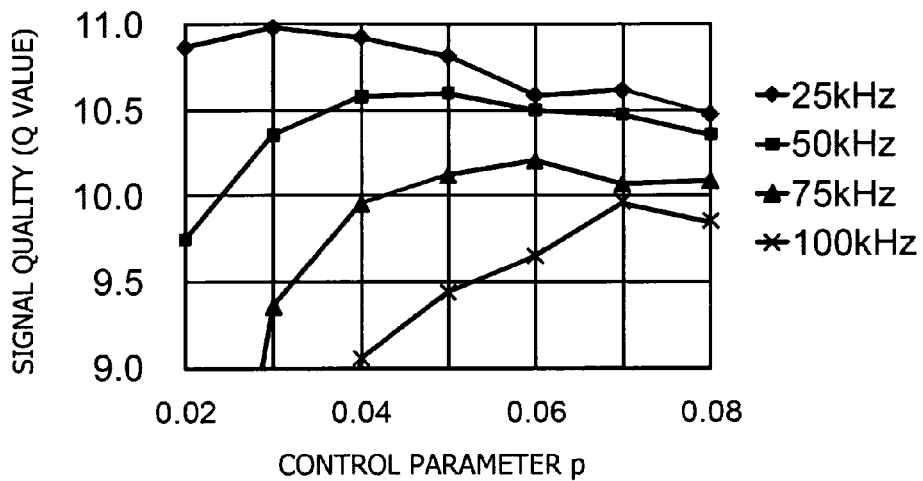
FIG. 9 is a diagram illustrating an example in which a relation between a control parameter and signal quality is calculated by changing polarization scrambling frequency.

FIG. 9 illustrates one example in which the relation between the control parameter p and signal quality (Q value) is calculated by changing the polarization scrambling frequency f. It is seen in FIG. 9 that the value of the control parameter p at which the signal quality becomes the best changes corresponding to the polarization scrambling frequency f. Accordingly, by optimizing the control parameter p corresponding to the speed of polarization fluctuations occurring due to the influence of polarization scrambling, excellent signal quality can be realized in the respective optical receivers 44-1 to 44-N.

Figure 10:
FIG. 10 is a diagram illustrating another example of a table referred to by the parameter calculator.

In the explanation of the operation of the polarization fluctuation compensation device 5, the presence of polarization scrambling of the optical signals having respective wavelengths it is expressed by using a binary of "1" and "0" (in the upper stage in FIG. 8). However, for example, as illustrated in FIG. 10, polarization fluctuations occurring due to the influence of polarization scrambling can be expressed by multiple values. Here the speed (frequency) of the polarization fluctuations detected by the polarization scrambling detector 52 is expressed stepwise between 0 and 1, based on the polarization scrambling frequency f.

Moreover, when the target value of the control parameter p corresponding to the combination of the polarization scrambled optical signal and the non-polarization scrambled optical signal is determined by using the tables illustrated in FIG. 8 and FIG. 10, if the number of wavelength multiplexing of the WDM light increases, combination of the polarization scrambled optical signal and the non-polarization scrambled optical signal becomes complicated and a large scale table is required. In such a situation, the target value of the control parameter can be determined based on calculation according to a procedure illustrated, for example, in the flowchart in FIG. 11, instead of using the table.

Specifically, as in steps 110 and 120 illustrated in FIG. 7, it is detected whether the optical signals having respective wavelengths $\lambda_1$ to $\lambda_{M+N}$ have been polarization scrambled, and the results thereof are collected by the information collection section 53. Then in step 131 in FIG. 11, the parameter calculator 54 determines the relation in the following equation (5) by using the information from the information collection section 53.

$$\sum_{k=m}^{n} \lambda_{SCR}[k] \geq 1 \quad (5)$$

$$\begin{cases} i - N_1 \leq 0: m = 1 \\ i - N_1 > 0: m = i - N_1 \end{cases}$$

$$\begin{cases} i + N_1 \leq N_{total}: n = i + N_1 \\ i + N_1 > N_{total}: n = N_{total} \end{cases}$$

where $\lambda_{SCR}$ [k] denotes an index indicating whether a wavelength channel k has been polarization scrambled, with "0" indicating "non-polarization scrambled", and "1" indicating "polarization scrambled". Moreover, i denotes a wavelength channel for which a target value of the control parameter p is to be calculated. $N_{total}$ denotes the number of wavelength multiplexing of the WDM light transmitted on the optical transmission path 2. $N_1$ is a first determination parameter to be used for determining the control parameter p, and indicates a wavelength range in which a search is made of whether there is a polarization scrambled optical signal. For example, in the case of $N_1$=3, a search is made of whether there is a polarization scrambled optical signal in a range of the wavelength channel i±3 based on the wavelength channel i to be calculated.

Figure 11:
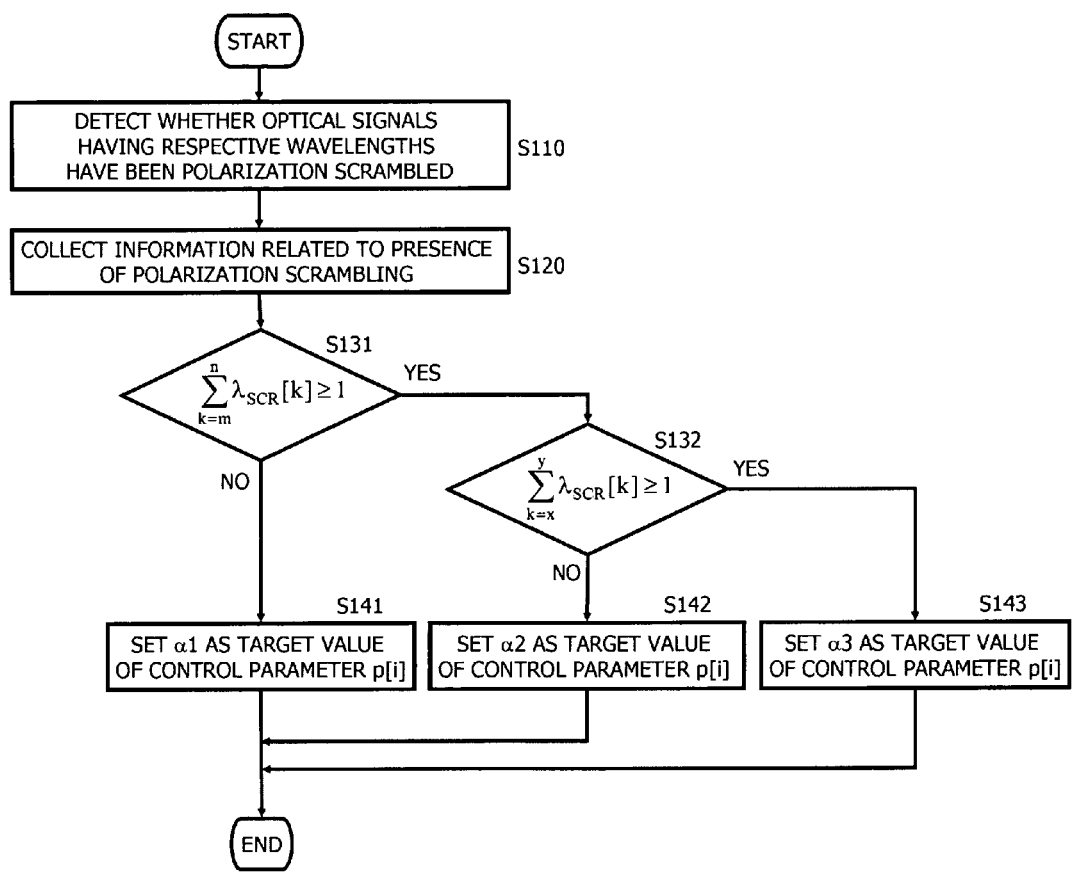
FIG. 11 is a flowchart illustrating another example of an operation of the polarization fluctuation compensation device of the first embodiment.
Figures 12, 13:
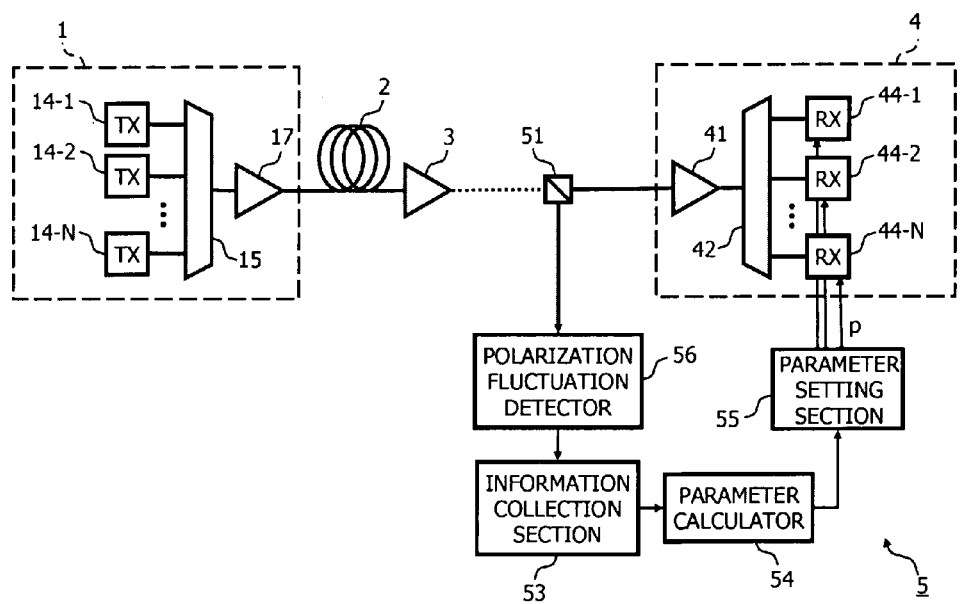
FIG. 12 is a diagram for explaining a determination process in FIG. 11.
FIG. 13 is a diagram illustrating the configuration of a second embodiment of an optical communication system.

For the determination processing in step 131, combinations #5 to #7 of the polarization scrambled optical signals and the non-polarization scrambled optical signals having the respective wavelengths as illustrated for example in FIG. 12 are assumed, to consider a case in which wavelength $\lambda_1$ is to be calculated. In this case, i=1, and $N_{total}$=8. When it is assumed that $N_1$=3 is set, because i−$N_1$=−2<0, m=1 is set, and because i+$N_1$=4<$N_{total}$=8, n=4 is set. In the case of combination #5 in FIG. 12, because the left-hand value in equation (5) is "0", control proceeds to step 141 in the flowchart in FIG. 11, to set "α1" as a target value of a control parameter p[1]. Moreover in the case of combination #6 in FIG. 12, because the left-hand value in equation (5) is "1", control proceeds to step 132 in the flowchart in FIG. 11. Furthermore in the case of combination #7 in FIG. 12, because the left-hand value in equation (5) is "3", control proceeds to step 132 in the flowchart in FIG. 11. That is, in the determination processing in step 131, a value is obtained by totaling indexes indicating whether adjacent wavelength channels in a range of ±$N_1$ have been polarization scrambled, based on the wavelength channel i to be calculated, and it is determined whether the value is equal to or larger than 1.

In step 132, the following relation in equation (6) is determined.

$$\sum_{k=x}^{y} \lambda_{SCR}[k] \geq 1 \quad (6)$$

$$\begin{cases} i - N_2 \leq 0: x = 1 \\ i - N_2 > 0: x = i - N_2 \end{cases}$$

$$\begin{cases} i + N_2 \leq N_{total}: y = i + N_2 \\ i + N_2 > N_{total}: y = N_{total} \end{cases}$$

where $N_2$ is a second determination parameter to be used for determining the control parameter p, and a value smaller than the first determination parameter $N_1$ is set ($N_1$>$N_2$).

For the determination processing in step 132, subsequent steps after step 131 in combinations #5 to #7 in FIG. 12 described above are explained. When $N_2$=1 is set, because i−$N_2$=0, x=1 is set, and because i+$N_2$=2<$N_{total}$=8, y=2 is set. Moreover in the case of combination #6 in FIG. 12, because the left-hand value in equation (6) is "0", control proceeds to step 142 in the flowchart in FIG. 11, to set "α2" as a target value of the control parameter p[1]. Furthermore in the case of combination #7 in FIG. 12, because the left-hand value in equation (6) is "1", control proceeds to step 143 in the flowchart in FIG. 11, to set "α3" as a target value of the control parameter p[1]. That is, in the determination processing in step 132, a value is obtained by totaling indexes indicating whether adjacent wavelength channels in a range of ±$N_2$ have been polarization scrambled, based on the wavelength channel i to be calculated, and it is determined whether the value is equal to or larger than 1. The target values to be set in steps 141 to 143 have a relation of α1>α2>α3, which is the same as in the case of using the table illustrated in FIG. 8.

In the above manner, by determining the target value of the control parameter p corresponding to the respective wavelengths by the calculation processing according to the flowchart in FIG. 11, even when the number of wavelength multiplexing of the WDM light transmitted on the optical transmission path 2 increases, a large scale table need not be prepared, thereby enabling to easily realize the polarization fluctuation compensation device 5.

The number of conditional equations, and the value and number of determination parameters in the arithmetic processing according to the flowchart in FIG. 11 can be appropriately set and changed according; to the type of optical fiber used in the optical transmission path 2, the input power of the optical signal to the optical transmission path 2, the number of wavelength multiplexing and the wavelength interval of the WDM light, the frequency f of the polarization scrambler 13, and the system parameter such as of the modulation format of the respective optical signals.

Next is a description of a second embodiment of an optical communication system.

In the above first embodiment, an example is described where, in the case when a non-polarization scrambled optical signal is transmitted together with a polarization scrambled optical signal by upgrading the optical communication system, fast polarization fluctuations occurring in the non-polarization scrambled optical signal due to the influence of polarization scrambling are compensated for. However, the source occurrence of the fast polarization fluctuations is not limited to polarization scrambling, and the polarization state of transmission light may fluctuate faster than the normally assumed speed due to some factors other than polarization scrambling. Here one example of an optical communication system that can accommodate such a situation is described in the second embodiment.

FIG. 13 is a diagram illustrating the configuration of the second embodiment of the optical communication system. Parts the same as or corresponding to the configuration of the first embodiment, are denoted by the same reference symbols, and description thereof is omitted. In FIG. 13, in the optical communication system of the second embodiment, an optical transmission device 1 includes optical transmitters 14-1 to 14-N, a multiplexer 15, and a post-amplifier 17. Moreover an optical reception device includes a pre-amplifier 41, a demultiplexer 42, and optical receivers 44-1 to 44-N. In the optical communication system, polarization scrambling is not performed basically with respect to optical signals having respective wavelengths repeatedly transmitted from the optical transmission device 1 to the optical reception device 4 via an optical transmission path 2 and an optical repeater 3.

A polarization fluctuation compensation device 5 applied to the optical communication system extracts a part of the WDM light input to the optical reception device 4 as monitor light by a splitter 51, and provides the monitor light to a polarization fluctuation detector 56. The polarization fluctuation detector 56 detects the speed of polarization fluctuations in optical signals having respective wavelengths $\lambda_1$ to $\lambda_N$ included in the monitor light extracted by the splitter 51. The respective configuration examples (A) to (D) illustrated in FIG. 6 can also be applied to the polarization fluctuation detector 56. An information collection section 53 collects information related to the speed of polarization fluctuations corresponding to respective wavelengths $\lambda_1$ to $\lambda_N$ t detected by the polarization fluctuation detector 56.

In the optical communication system, the polarization fluctuation detector 56 detects the speed of polarization fluctuations occurring in the optical signals having respective wavelengths $\lambda_1$ to $\lambda_N$ transmitted on the optical transmission path 2 and input to the optical reception device 4, and the information collection section 53 collects the information. Then a parameter calculator 54 determines a target value of the control parameter p corresponding to the information obtained by the information collection section 53, by referring to a table in which the speed of polarization fluctuations is expressed by multiple values as illustrated, for example, in FIG. 10, and a parameter setting section 55 sets the target value as the control parameter p for the optical receivers 44-1 to 44-N corresponding to the respective wavelengths $\lambda_1$ to $\lambda_N$.

According to the optical communication system of the second embodiment, the influence of fast polarization fluctuations can be reliably compensated for by the polarization fluctuation compensation device 5, even if the polarization state of the optical signals having respective wavelengths $\lambda_1$ to $\lambda_N$ transmitted on the optical transmission path 2 fluctuates faster than the normally assumed speed due to some factors, thereby enabling to perform the reception processing of the optical signals using the polarization information, with high accuracy.

Next is a description of a third embodiment of an optical communication system.

In the first embodiment, a part of the WDM light transmitted from the optical transmission device 1 to the optical transmission path 2 is extracted by a splitter 51 to detect whether optical signals having respective wavelengths have been polarization scrambled by the polarization scrambling detector 52. However, when the optical transmission device 1 or the like has a function of outputting information related to the presence of polarization scrambling corresponding to respective wavelengths, the information related to the presence of polarization scrambling can be collected instead of directly monitoring optical signals having respective wavelengths, to determine the speed of polarization fluctuations in the non-polarization scrambled optical signal based on the information, thereby enabling to obtain a target value of the control parameter p for the optical receiver corresponding to each wavelength. The third embodiment corresponds to a configuration example in this case.

Figure 14:
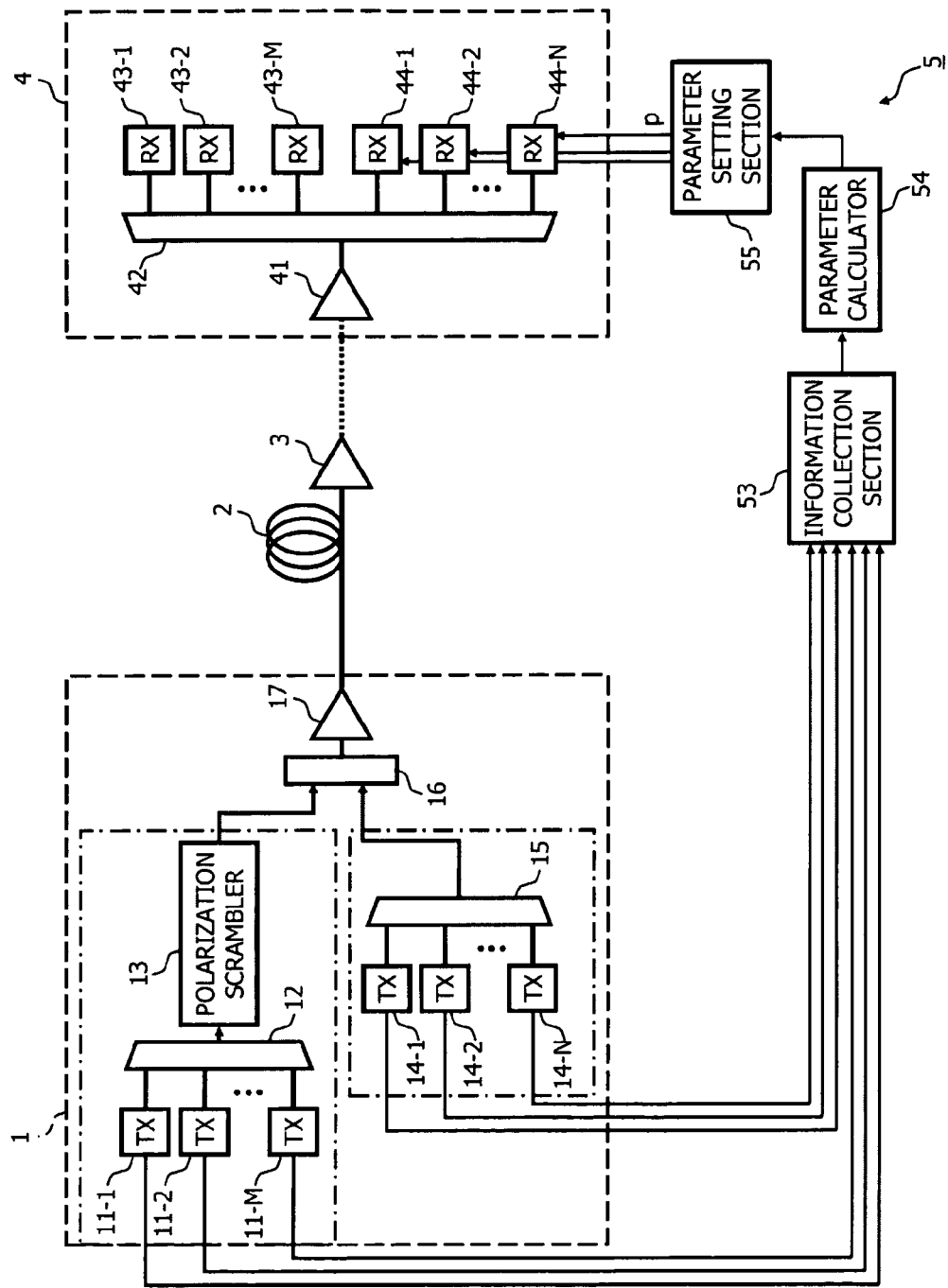
FIG. 14 is a diagram illustrating the configuration of a third embodiment of an optical communication system.

FIG. 14 is a diagram illustrating a configuration example of the optical communication system of the third embodiment.

In the optical communication system in FIG. 14, the splitter 51 and the polarization scrambling detector 52 of the polarization fluctuation compensation device 5 in the first embodiment are omitted, and an information collection section 53 collects flag information indicating the presence of polarization scrambling to be output from respective optical transmitters 11-1 to 11-M, and 14-1 to 14-N inside the optical transmission device 1 to the outside. For example, it is assumed that the flag information indicates "1" when polarization scrambling is performed with respect to the optical signal output from the optical transmitter, and indicates "0" when polarization scrambling is not performed. The information collection section 53 collects the flag information matched with the respective wavelengths, thereby obtaining information related to the presence of polarization scrambling corresponding to all the wavelengths of the WDM light transmitted from the optical transmission device 1 to the optical transmission path 2.

Accordingly, a parameter calculator 54 determines a target value of the control parameter p corresponding to the information from the information collection section 53 by referring to the table as illustrated in FIG. 8, or according to the relational expression shown in the flowchart of FIG. 11, and a parameter setting section 55 sets the target value obtained by the parameter calculator 54 as a control parameter in the reception processing performed in the optical receivers 44-1 to 44-N on the non-polarization scrambled side, thereby enabling to reliably compensate for fast polarization fluctuations occurring in the non-polarization scrambled optical signal, and perform the reception processing of the optical signal using the polarization information, with high accuracy.

In the third embodiment, an example in which the presence of polarization scrambling is determined by using the flag information output from the respective optical transmitters 11-1 to 11-M and 14-1 to 14-N is described. However, information available for determining the presence of polarization scrambling is not limited to the example described above. For example, when reception processing is performed with respect to a non-polarization scrambled optical signal by the digital coherent receiver as illustrated in FIG. 2 to FIG. 4, the respective optical receivers inside the optical reception device 4 can output to the outside, flag information indicating the presence of output of local oscillation light, and collect the flag information from the respective optical receivers by the information collection section 53. Because polarization scrambling is not performed basically with respect to the optical signal to be received by the digital coherent receiver, when the flag information indicates that there is an output of local oscillation light, it can be determined that there is no polarization scrambling, and when the flag information indicates that there is no output of local oscillation light, it can be determined that there is polarization scrambling.

Figure 15:
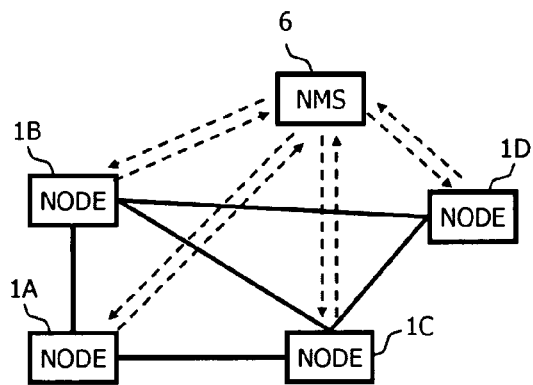
FIG. 15 is a diagram illustrating a configuration example of a meshed network associated with the third embodiment.

Moreover, for example, for a meshed network as illustrated in FIG. 15, when the polarization fluctuation compensation device 5 is used for a reception section of respective nodes 1A to 1D, information related to the presence of polarization scrambling corresponding to the respective wavelengths, transmitted from a network management system (NMS) 6 which manages the operation status of the entire network, to respective nodes 1A to 1D, can be used. In the meshed network in FIG. 15, because a transmission path for the optical signal received by the respective nodes 1A to 1D is different for each wavelength, the polarization fluctuations can be compensated for more reliably by determining the presence of polarization scrambling corresponding to respective reception wavelengths by using information managed in the NMS 6, than by directly detecting the polarization state of the optical signal at the transmission ends of the respective nodes 1A to 1D.

Next is a description of a fourth embodiment of an optical communication system. In the fourth embodiment, an application example for improving compensation accuracy of polarization fluctuations in the first to third embodiments is described.

Figure 16:
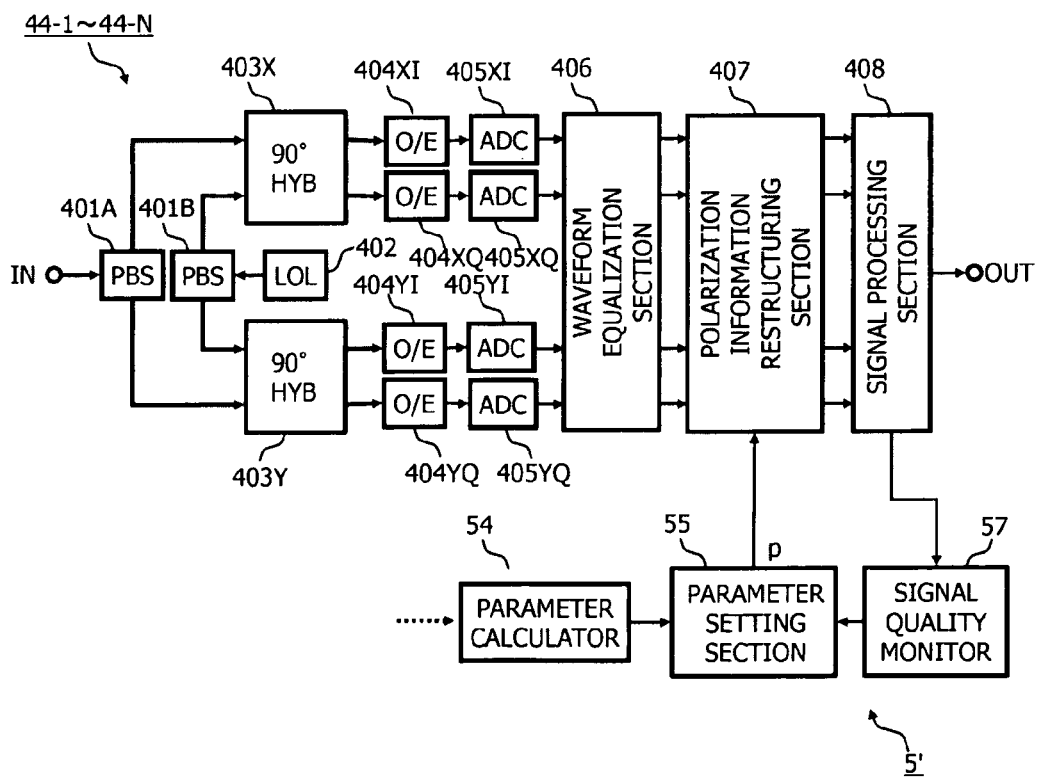
FIG. 16 is a diagram illustrating the configuration of a main part of the polarization fluctuation compensation device applied to a fourth embodiment of an optical communication system, together with a configuration example of the optical receiver.
Figure 17:
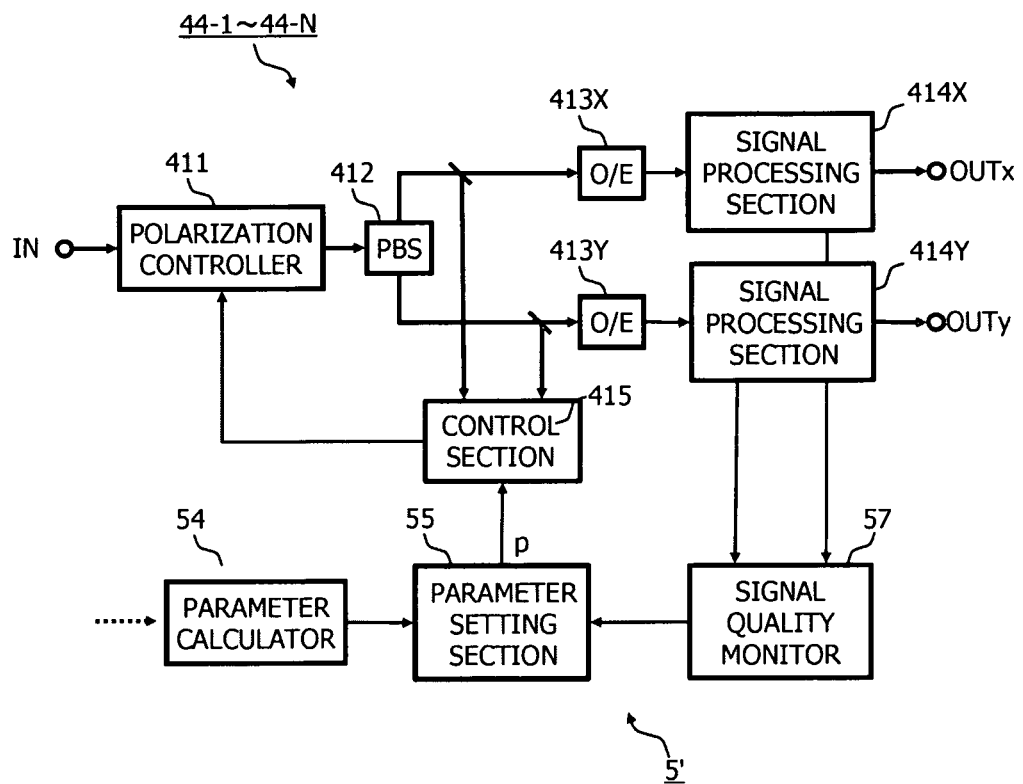
FIG. 17 is a diagram illustrating the configuration of a main part of the polarization fluctuation compensation device applied to the fourth embodiment of the optical communication system, together with another configuration example of the optical receiver.

FIG. 16 and FIG. 17 are diagrams illustrating the configuration of the main part of the polarization fluctuation compensation device applied to an optical communication system of the fourth embodiment, together with a configuration example of optical receivers 44-1 to 44-N. FIG. 16 is an application example corresponding to the digital coherent receiver illustrated in FIG. 2, and FIG. 17 is an application example corresponding to the direct detection receiver illustrated in FIG. 5. The configuration of the entire optical communication system is the same as that illustrated in FIG. 1, FIG. 13, or FIG. 14.

In FIG. 16 and FIG. 17, a polarization fluctuation compensation device 5' applied to the fourth embodiment further includes a signal quality monitor 57 in addition to the configuration of the polarization fluctuation compensation device 5 in any one of the first to third embodiments. The signal quality monitor 57 monitors information related to the quality of a reception signal output from a signal processing section 408 (FIG. 16) or signal processing sections 414X and 414Y (FIG. 17) of the optical receivers 44-1 to 44-N, and feeds back the monitoring result to a parameter setting section 55. As the information related to the signal quality monitored by the signal quality monitor 57, for example; information of the number of error corrections detected at the time of error correction, a bit error rate (BER), or a ratio between average power and standard deviation of signal light monitored by a digital coherent receiver as described in Japanese Laid-Open Patent Publication No. 2009-198364 can be used.

Figure 18:
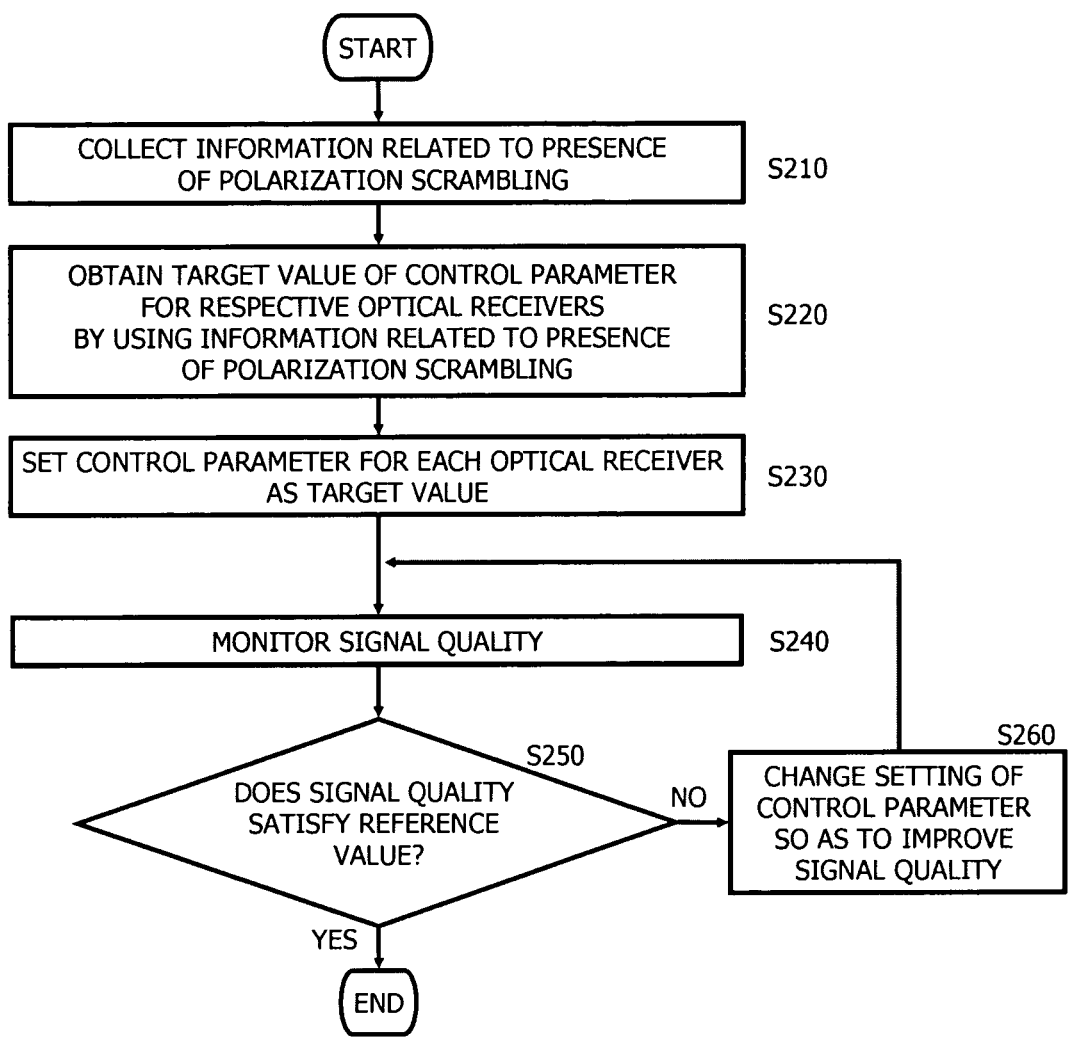
FIG. 18 is a flowchart illustrating an example of an operation of the polarization fluctuation compensation device of the fourth embodiment.

FIG. 18 is a flowchart illustrating one example of an operation performed by the polarization fluctuation compensation device 5'. In the polarization fluctuation compensation device 5', at first, as in the case of the first to third embodiments, an information collection section 53 collects information related to the presence of polarization scrambling (or the speed of polarization fluctuations) in the optical signals having respective wavelengths (S210), and a parameter calculator 54 obtains a target value of the control parameter p by referring to the table illustrated in FIG. 8 or the like, or according to the relational expression shown in the flowchart of FIG. 11, by using the information from the information collection section 53 (S220). Then a parameter setting section 55 sets a control parameter in the reception processing performed by the respective optical receivers 44-1 to 44-N, to the target value (S230).

In the subsequent step 240, the signal quality monitor 57 monitors the information related to the quality of the reception signal output from the signal processing sections in the respective optical receivers 44-1 to 44-N. In step 250, the parameter setting section 55 determines whether the signal quality of the respective wavelengths monitored by the signal quality monitor 57 satisfies a preset reference value. When the signal quality satisfies the reference value, the value of the current control parameter value is maintained. On the other hand, when the signal quality does not satisfy the reference value, control proceeds to step 260.

In step 260, the parameter setting section 55 changes the value of the control parameter set in the optical receiver so as to improve the signal quality monitored by the signal quality monitor 57, and control returns to step 240. As the change of the control parameter, when the target value of the control parameter obtained in step 220 is $\alpha_j$, for example, the control parameter is sequentially changed to $\alpha_{j+1}$, $\alpha_{j-1}$, $\alpha_{j+2}$, $\alpha_{j-2}$, and so on, to search for a value at which the signal quality satisfies the reference value near the target value $\alpha_j$. Moreover, for example, when the number of candidate values of the control parameter is limited, such a value at which the signal quality satisfies the reference value for all the candidate values can be searched.

According to the optical communication system of the fourth embodiment, because setting of the control parameter is feedback controlled according to the actual reception signal quality in the respective optical receivers 44-1 to 44-N, in addition to setting the control parameter with respect to the respective optical receivers 44-1 to 44-N in a feed forward manner according to the target value obtained by the parameter calculator 54 of the polarization fluctuation compensation device 5', compensation of the polarization fluctuations can be more reliably performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A polarization fluctuation compensation device that compensates for quality deterioration of a signal waveform occurring in reception processing of WDM light including a non-polarization scrambled optical signal, comprising:
    an information collection circuit adapted to collect information related to a frequency of polarization fluctuations in a polarization scrambled optical signal;
    a parameter calculator circuit adapted to obtain a target value of a control parameter with respect to the reception processing related to polarization information of the non-polarization scrambled optical signal, based on information related to the frequency collected by the information collection circuit; and
    a parameter setting circuit adapted to set the target value obtained by the parameter calculator circuit, as the control parameter in the reception processing corresponding to the non-polarization scrambled optical signal.

2. The polarization fluctuation compensation device according to claim 1, wherein
the WDM light includes the polarization scrambled optical signal and the non-polarization scrambled optical signal,
and there is provided:
a splitter adapted to extract a part of the WDM light as monitoring light; and
a polarization scrambling detector adapted to detect whether an optical signal of each wavelength included in the monitoring light extracted by the splitter has been polarization scrambled,
and the information collection circuit is adapted to collect information related to a presence of polarization scrambling in the optical signal of each wavelength detected by the polarization scrambling detector,
the parameter calculator circuit is adapted to determine the frequency of polarization fluctuations in the non-polarization scrambled optical signal, based on information collected by the information collection circuit, to obtain a target value of the control parameter for an optical receiver corresponding to the non-polarization scrambled optical signal according to the determination result, and
the parameter setting circuit is adapted to set the target value obtained by the parameter calculator circuit, as a control parameter for the optical receiver corresponding to the non-polarization scrambled optical signal.

3. The polarization fluctuation compensation device according to claim 1, wherein
the WDM light includes the polarization scrambled optical signal and the non-polarization scrambled optical signal,
the information collection circuit is adapted to collect information related to a presence of polarization scrambling corresponding to each wavelength of the WDM light output from an external device,
the parameter calculator circuit is adapted to determine the frequency of polarization fluctuations in the non-polarization scrambled optical signal, based on information collected by the information collection circuit, to obtain a target value of the control parameter for an optical receiver corresponding to the non-polarization scrambled optical signal according to the determination result, and
the parameter setting circuit is adapted to set the target value obtained by the parameter calculator circuit, as a control parameter for the optical receiver corresponding to the non-polarization scrambled optical signal.

4. The polarization fluctuation compensation device according to claim 1, wherein
the WDM light includes the polarization scrambled optical signal and the non-polarization scrambled optical signal,
the parameter calculator circuit has a table in which a target value of the control parameter corresponding to a combination of a polarization scrambled optical signal and a non-polarization scrambled optical signal having respective wavelengths is set, and determines the target value of the control parameter corresponding to the information collected by the information collection circuit by referring to the table.

5. The polarization fluctuation compensation device according to claim 1, wherein
the WDM light includes the polarization scrambled optical signal and the non-polarization scrambled optical signal,
the parameter calculator circuit conducts a search of whether there is a polarization scrambled optical signal in at least one wavelength range set based on a wavelength of a non-polarization scrambled optical signal, according to arithmetic processing using information collected by the information collection circuit, and determines the target value of the control parameter according to the search result.

6. The polarization fluctuation compensation device according to claim 2, wherein
the WDM light includes the polarization scrambled optical signal and the non-polarization scrambled optical signal, and the non-polarization scrambled optical signal is processed by a digital coherent receiver.

7. The polarization fluctuation compensation device according to claim 6, wherein
the parameter calculator circuit obtains the target value of the control parameter, by setting a step size of a digital filter in arithmetic processing for restructuring polarization information to be performed by the digital coherent receiver, as the control parameter.

8. The polarization fluctuation compensation device according to claim 1, wherein
the WDM light includes the polarization scrambled optical signal and the non-polarization scrambled optical signal, and the non-polarization scrambled optical signal is processed by a direct detection receiver.

9. The polarization fluctuation compensation device according to claim 8, wherein
the parameter calculator circuit obtains the target value of the control parameter, by setting a loop gain in feedback control of a polarization controller to be performed by the direct detection receiver, as the control parameter.

10. The polarization fluctuation compensation device according to claim 1, comprising:
a splitter adapted to extract a part of the WDM light as monitoring light; and
a polarization fluctuation detecting circuit adapted to detect the frequency of polarization fluctuations in an optical signal of each wavelength included in the monitoring light extracted by the splitter,
and the information collection circuit is adapted to collect information related to the frequency of polarization fluctuations in the optical signal of each wavelength detected by the polarization fluctuation detecting circuit.

11. The polarization fluctuation compensation device according to claim 1, comprising:
a signal quality monitor adapted to monitor information related to quality of the WDM light of each wavelength,
and the parameter setting circuit is adapted to determine whether the quality of a reception signal corresponding to each wavelength satisfies a reference value, based on information monitored by the signal quality monitor, and change a set value of the control parameter so that a quality of the reception signal satisfies the reference value for a wavelength, which does not satisfy the reference value.

12. An optical communication system that includes; an optical transmission device that transmits WDM light including a plurality of optical signals having different wavelengths to an optical transmission line, and an optical reception device that receives the WDM light transmitted on the optical transmission line,
and there is provided the polarization fluctuation compensation device according to claim 1.

13. The optical communication system according to claim 12, comprising at least one optical repeater arranged on the optical transmission line,
  and the optical transmission device includes; a plurality of optical transmitters, a polarization scrambler to which a part of a plurality of optical signals having different wavelengths output from the plurality of optical transmitters is input, and a multiplexer that multiplexes an optical signal polarization scrambled by the polarization scrambler and remaining non-polarization scrambled optical signals,
  and the optical reception device includes; a demultiplexer adapted to demultiplex WDM light that is repeatedly transmitted by the optical transmission line and the at least one optical repeater, at least one optical receiver that receives a polarization scrambled optical signal among optical signals having respective wavelengths output from the demultiplexer, and at least one optical receiver that receives a non-polarization scrambled optical signal among the optical signals having respective wavelengths output from the demultiplexer.

* * * * *